United States Patent
Kim et al.

(10) Patent No.: US 12,107,297 B2
(45) Date of Patent: Oct. 1, 2024

(54) COMPOSITION FOR COATING LAYER INCLUDING HEAT-RESISTANT BINDER, HYDROXY-CONTAINING POLYIMIDE PARTICLE, AND SILANE CROSSLINKER, SEPARATOR FOR RECHARGEABLE LITHIUM BATTERY INCLUDING COATING LAYER FORMED THEREFROM AND RECHARGEABLE LITHIUM BATTERY INCLUDING THE SAME

(71) Applicants: SAMSUNG SDI CO., LTD., Yongin-si (KR); IUCF-HYU (Industry-University Cooperation Foundation Hanyang University), Seoul (KR)

(72) Inventors: Gain Kim, Yongin-si (KR); Yeonjoo Choi, Yongin-si (KR); Jayeon Gu, Yongin-si (KR); Yangseob Kim, Yongin-si (KR); Jae Hoon Kim, Seoul (KR); Sun Ju Moon, Seoul (KR); Young Moo Lee, Seoul (KR)

(73) Assignees: SAMSUNG SDI CO., LTD., Yongin-si (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 155 days.

(21) Appl. No.: 17/133,186

(22) Filed: Dec. 23, 2020

(65) Prior Publication Data
US 2021/0305659 A1    Sep. 30, 2021

(30) Foreign Application Priority Data

Mar. 20, 2020    (KR) ........................ 10-2020-0034492
Mar. 20, 2020    (KR) ........................ 10-2020-0034493

(51) Int. Cl.
*H01M 50/449*    (2021.01)
*C08K 5/54*    (2006.01)
(Continued)

(52) U.S. Cl.
CPC .......... *H01M 50/449* (2021.01); *C08L 79/08* (2013.01); *C09D 7/65* (2018.01); *C09D 7/68* (2018.01);
(Continued)

(58) Field of Classification Search
CPC .... H01M 50/449; H01M 50/491; C09D 7/65; C09D 7/68; C09D 133/02; C09D 133/26; C08L 79/08
(Continued)

(56) References Cited

U.S. PATENT DOCUMENTS

2013/0244080 A1* 9/2013 Song ................... H01M 50/454
                                                                              429/247
2013/0252066 A1    9/2013 Yeou
(Continued)

FOREIGN PATENT DOCUMENTS

CN    107895766 A    *  4/2018
JP    2000-248063        9/2000
(Continued)

OTHER PUBLICATIONS

Lee et al., Electrochemical performance of a thermally rearranged polybenzoxazole nanocomposite membrane as a separator for lithium-ion batteries at elevated temperature, Dec. 2015, Journal of Power Sources, 305, 259-266 (Year: 2015).*
(Continued)

*Primary Examiner* — Sean P Cullen
(74) *Attorney, Agent, or Firm* — Knobbe, Martens, Olson & Bear, LLP

(57) ABSTRACT

This application relates to a coating layer composition and a coating layer formed using the coating layer composition.
(Continued)

The coating layer composition includes a heat-resistant binder, a hydroxy group-containing polyimide particle, a silane cross-linking agent, and a solvent. The hydroxy group-containing polyimide particle and the functional group-containing silane cross-linking agent form a core-shell structured organic particle in which a core portion is derived from the hydroxy group-containing polyimide particles and a shell portion that is derived from the functional group-containing silane cross-linking agent. The shell portion is on the surface of the core portion in the core-shell structured organic particle. The application also relates to a separator for a rechargeable lithium battery and a rechargeable lithium battery including the separator having a coating layer formed using the coating layer composition.

15 Claims, 4 Drawing Sheets

(51) Int. Cl.
  C08K 5/5419  (2006.01)
  C08L 79/08  (2006.01)
  C09D 7/40  (2018.01)
  C09D 7/65  (2018.01)
  C09D 133/02  (2006.01)
  C09D 133/26  (2006.01)
  H01M 4/02  (2006.01)
  H01M 10/0525  (2010.01)
  H01M 10/44  (2006.01)
  H01M 50/491  (2021.01)

(52) U.S. Cl.
  CPC ......... C09D 133/02 (2013.01); C09D 133/26 (2013.01); H01M 10/0525 (2013.01); H01M 10/44 (2013.01); H01M 50/491 (2021.01); C08K 5/5406 (2013.01); C08K 5/5419 (2013.01); C08L 2207/53 (2013.01); C08L 2312/08 (2013.01); H01M 2004/027 (2013.01); H01M 2004/028 (2013.01)

(58) Field of Classification Search
  USPC ................ 429/144, 251, 253, 254
  See application file for complete search history.

(56) References Cited

U.S. PATENT DOCUMENTS

| | | | |
|---|---|---|---|
| 2013/0280584 A1* | 10/2013 | Matsumura | H01M 50/426 429/251 |
| 2013/0323569 A1* | 12/2013 | Yeou | H01M 10/052 429/144 |
| 2015/0037653 A1* | 2/2015 | Saito | B01D 67/002 429/145 |
| 2016/0149184 A1 | 6/2016 | Nam et al. | |
| 2017/0033348 A1* | 2/2017 | Murakami | H01M 4/131 |
| 2017/0033423 A1* | 2/2017 | Choi | H01M 8/0662 |
| 2017/0338461 A1 | 11/2017 | Seo | |
| 2018/0026270 A1* | 1/2018 | Bae | H01M 4/587 429/217 |
| 2019/0237734 A1 | 8/2019 | Lee et al. | |
| 2019/0280274 A1 | 9/2019 | Kim et al. | |
| 2020/0131314 A1 | 4/2020 | Chayama et al. | |
| 2020/0144608 A1* | 5/2020 | Jeong | H01M 4/366 |
| 2020/0243861 A1* | 7/2020 | Yamamoto | C08F 297/044 |
| 2020/0403205 A1* | 12/2020 | Lee | H01M 50/443 |
| 2021/0408638 A1 | 12/2021 | Choi et al. | |
| 2022/0181617 A1* | 6/2022 | Kim | H01M 4/0471 |
| 2022/0403169 A1* | 12/2022 | Sakai | C08G 63/199 |

FOREIGN PATENT DOCUMENTS

| | | | | |
|---|---|---|---|---|
| JP | 2018026266 A | * | 2/2018 | ......... H01M 50/403 |
| KR | 10-2013-0107550 A | | 10/2013 | |
| KR | 10-2015-0034825 A | | 4/2015 | |
| KR | 10-2016-0061165 A | | 5/2016 | |
| KR | 10-2017-0083283 A | | 7/2017 | |
| KR | 10-2017-0129637 A | | 11/2017 | |
| KR | 10-2018-0010789 A | | 1/2018 | |
| KR | 10-2007696 | | 7/2019 | |
| KR | 10-2019-0093444 A | | 8/2019 | |
| KR | 10-2019-0105881 A | | 9/2019 | |
| KR | 10-2020-0027517 | | 3/2020 | |
| KR | 10-2084099 B1 | | 3/2020 | |
| WO | WO-2014024991 A1 | * | 2/2014 | ......... H01M 10/0525 |
| WO | WO-2015008626 A1 | * | 1/2015 | ............ C08F 220/56 |
| WO | WO-2019039560 A1 | * | 2/2019 | ............ C08F 212/08 |

OTHER PUBLICATIONS

Office action dated Mar. 30, 2023 in corresponding Korean patent application No. 10-2020-0034493, 7 pp.
Lee et al., 2015, Highly lithium ion conductive battery separators, Chemical Communications, 51:2068-2071.
Office Action dated May 25, 2023 in corresponding Korean patent application No. 10-2020-0034492.
Notice of allowance dated Feb. 23, 2024 in corresponding Korean patent application No. 10-2020-0034492, 6 pp.

* cited by examiner

COMPOSITION FOR COATING LAYER INCLUDING HEAT-RESISTANT BINDER, HYDROXY-CONTAINING POLYIMIDE PARTICLE, AND SILANE CROSSLINKER, SEPARATOR FOR RECHARGEABLE LITHIUM BATTERY INCLUDING COATING LAYER FORMED THEREFROM AND RECHARGEABLE LITHIUM BATTERY INCLUDING THE SAME

CROSS-REFERENCE TO RELATED APPLICATIONS

This application claims priority to and the benefit of Korean Patent Application No. 10-2020-0034492 filed in the Korean Intellectual Property Office on Mar. 20, 2020, and Korean Patent Application No. 10-2020-0034493 filed in the Korean Intellectual Property Office on Mar. 20, 2020, the entire contents of which are incorporated herein by reference.

BACKGROUND

(a) Field

The present application is related to a coating layer composition, a separator for a rechargeable lithium battery including a coating layer formed therefrom, and a rechargeable lithium battery including the same.

(b) Description of the Related Technology

A separator for an electrochemical battery is an intermediate film that separates a positive electrode and a negative electrode in a battery, and maintains ion conductivity continuously to enable charge and discharge of a battery. When a battery is exposed to a high temperature environment due to abnormal behavior, the separator may mechanically shrink or be damaged due to melting characteristics at a low temperature. As a result, the positive electrode and negative electrode can contact each other and may cause an explosion of the battery. In order to overcome this problem, technology of suppressing shrinkage of a separator and ensuring stability is required.

SUMMARY

An embodiment provides a separator for a rechargeable lithium battery having improved high heat resistance, in particular, wet thermal shrinkage, and a rechargeable lithium battery including the same while securing excellent adhesive characteristics.

In an embodiment, a coating layer composition includes a heat-resistant binder, a hydroxy group-containing polyimide particle, a functional group-containing silane cross-linking agent, and a solvent.

In another embodiment, a separator for a rechargeable lithium battery includes a porous substrate; and a coating layer on at least one surface of the porous substrate, wherein the coating layer is formed from the aforementioned coating layer composition.

In another embodiment, a rechargeable lithium battery includes a positive electrode, a negative electrode, and the separator for a rechargeable lithium battery between the positive electrode and the negative electrode.

It is possible to implement a rechargeable lithium battery including a separator for a rechargeable lithium battery having high heat resistance while securing excellent adhesive characteristics.

According to one or more alternative embodiments, a coating layer composition for a separator of a rechargeable lithium battery is provided. The coating layer composition comprises a heat-resistant binder, a hydroxy group-containing polyimide particle, a functional group-containing silane cross-linking agent, and a solvent. The hydroxy group-containing polyimide particle and the functional group-containing silane cross-linking agent form a core-shell structured organic particle. The core-shell structured organic particle comprises a core portion derived from the hydroxy group-containing polyimide particles, and a shell portion derived from the functional group-containing silane cross-linking agent, wherein the shell portion is on the surface of the core portion.

According to one or more alternative embodiments of the coating layer composition, the core-shell structured organic particle has a particle diameter of about 100 nm to about 1000 nm. The core portion has a particle diameter of about 70 nm to about 970 nm. The shell portion has a particle diameter of about 5 nm to about 50 nm.

According to one or more alternative embodiments of the coating layer composition, a weight ratio of the heat-resistant binder:core-shell structured organic particle is about 1:20 to about 1:40.

According to one or more alternative embodiments of the coating layer composition, the hydroxy group-containing polyimide particle comprises a structural unit represented by Chemical Formula 1:

[Chemical Formula 1]

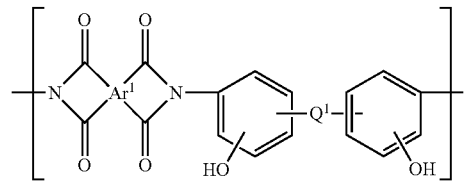

wherein, in Chemical Formula 1:
$Ar^1$ is an aromatic cyclic group selected from a substituted or unsubstituted tetravalent C6 to C30 arylene group and a substituted or unsubstituted tetravalent C4 to C30 heterocyclic group,
the aromatic ring group are present alone, two or more are fused to each other to form a condensed ring, or two or more are linked by a functional group of single bonds, O, S, C(=O), CH(OH), S(=O)$_2$, Si(CH$_3$)$_2$, (CH$_2$)$_p$ (wherein 1≤p≤10), (CF$_2$)$_q$ (wherein, 1≤q≤10), C(CH$_3$)$_2$, C(CF$_3$)$_2$, or C(=O)NH, and
$Q^1$ is O, S, C(=O), CH(OH), S(=O)$_2$, Si(CH$_3$)$_2$, (CH$_2$)$_p$ (wherein, 1≤p≤10), (CF$_2$)$_q$, wherein, 1≤q≤10, or a substituted or unsubstituted phenylene group, C(CH$_3$)$_2$, C(CF$_3$)$_2$, or C(=O)NH. The hydroxy group-containing polyimide particle comprises a polyimide copolymer selected from the group consisting of a polyimide random copolymer further including a structural unit represented by Chemical Formula 2, a polyimide block copolymer further including a structural unit represented by Chemical Formula 2, and a combination thereof:

[Chemical Formula 2]

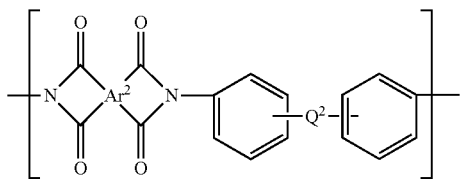

wherein, in Chemical Formula 2:

$Ar^2$ is an aromatic cyclic group selected from a substituted or unsubstituted tetravalent C6 to C30 arylene group and a substituted or unsubstituted tetravalent C4 to C30 heterocyclic group, the aromatic ring group are present alone, two or more are fused to each other to form a condensed ring, or two or more are linked by a functional group of single bonds, O, S, C(=O), CH(OH), S(=O)$_2$, Si(CH$_3$)$_2$, (CH$_2$)$_p$ (wherein, 1≤p≤10), (CF$_2$)$_q$ (wherein, 1≤q≤10), C(CH$_3$)$_2$, C(CF$_3$)$_2$, or C(=O)NH, and $Q^2$ is O, S, C(=O), CH(OH), S(=O)$_2$, Si(CH$_3$)$_2$, (CH$_2$)$_p$ (wherein, 1≤p≤10), (CF$_2$)$_q$ (wherein, 1≤q≤10), or a substituted or unsubstituted phenylene group, C(CH$_3$)$_2$, C(CF$_3$)$_2$ or C(=O)NH. The polyimide copolymer comprises a structural unit represented by Chemical Formula 1 and a structural unit represented by Chemical Formula 2 in a weight ratio of about 9:1 to about 1:9.

According to one or more alternative embodiments of the coating layer composition, the hydroxy group-containing polyimide particle has a weight average molecular weight of about 100,000 to about 5,000,000. The functional group-containing silane cross-linking agent is included in an amount of about 0.5 wt % to about 10 wt % based on a total solid weight of the coating layer composition. The functional group comprises at least one selected from the group consisting of a hydroxy group, an alkoxy group, a halogen group, an amino group, a vinyl group, and a glycidoxy group. The functional group-containing silane cross-linking agent comprises at least one selected from the group consisting of alkylalkoxysilane, vinylalkoxysilane, glycidoxyalkylalkoxysilane, aminoalkylalkoxysilane, mercaptoalkylalkoxysilane, halogenated alkylalkoxysilane, vinylhalosilane, and alkylacyloxy. silane.

According to one or more alternative embodiments of the coating layer composition, the heat-resistant binder comprises a (meth)acrylic copolymer comprises a first structural unit derived from (meth)acrylamide, a second structural unit derived from (meth)acrylic acid, (meth)acrylate or (meth)acrylonitrile, and a third structural unit derived from (meth)acrylamidosulfonic acid or a salt of (meth)acrylamidosulfonic acid. The first structural unit is included in an amount of about 80 mol % to about 85 mol % based on 100 mol % of the (meth)acrylic copolymer, the second structural unit is included in an amount of about 10 mol % to about 15 mol % based on 100 mol % of the (meth)acrylic copolymer, and the third structural unit is included in an amount of about 5 mol % to about 10 mol % based on 100 mol % of the (meth)acrylic copolymer. The (meth)acrylic copolymer has a weight average molecular weight of about 300,000 to about 950,000.

According to one or more alternative embodiments, a separator for a rechargeable lithium battery comprises a porous substrate and a coating layer on at least on one surface of the porous substrate. The coating layer formed from a coating layer composition. The coating layer composition comprises a heat-resistant binder, a hydroxy group-containing polyimide particle, a functional group-containing silane cross-linking agent, and a solvent.

According to one or more alternative embodiments, the separator has a break down voltage of greater than or equal to about 1.3 kV. According to one or more alternative embodiments, the separator has a moisture content of less than or equal to about 500 ppm.

According to one or more alternative embodiments, a rechargeable lithium battery comprises a positive electrode, a negative electrode, and a separator interposed between the positive electrode and the negative electrode. The separator comprises a porous substrate and a coating layer on at least on one surface of the porous substrate. The coating layer is formed from a coating layer composition. The coating layer composition comprises a heat-resistant binder, a hydroxy group-containing polyimide particle, a functional group-containing silane cross-linking agent, and a solvent.

DETAILED DESCRIPTION

Figure 1:
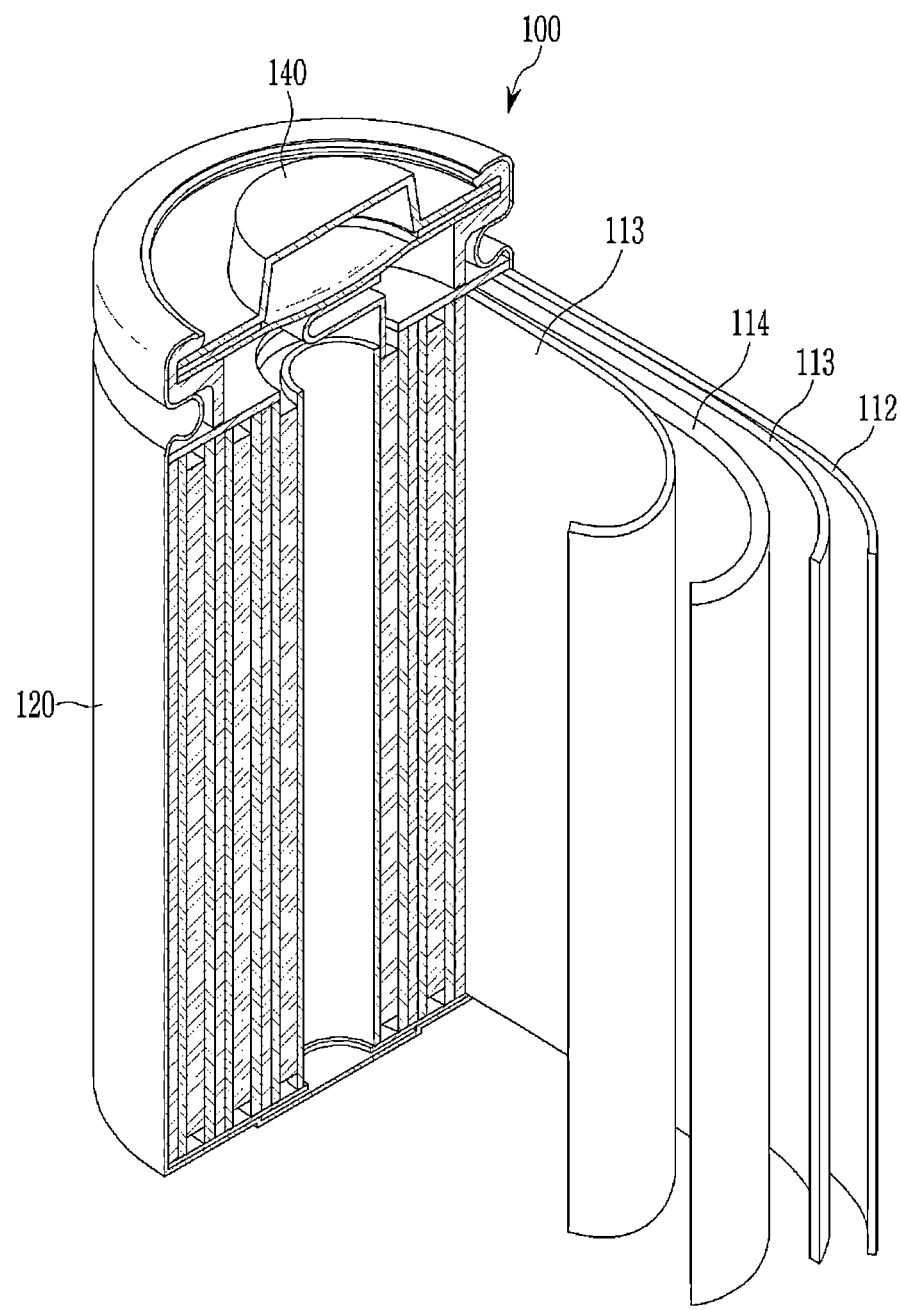
FIG. 1 is an exploded perspective view of a rechargeable lithium battery according to an embodiment.

A method of increasing thermal resistance of the separator by coating the separator with a mixture of inorganic particles having a large thermal resistance and an organic binder having adhesion is well known. However, it is difficult to sufficiently secure wet thermal shrinkage characteristics that affect actual battery performance in the conventional method.

Hereinafter, embodiments of the present disclosure are described in detail. However, these embodiments are exemplary, the present disclosure is not limited thereto and the present disclosure is defined by the scope of claims.

As used herein, when a definition is not otherwise provided, "substituted" refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

As used herein, when a definition is not otherwise provided, the term 'hetero' refers to one including 1 to 3 heteroatoms selected from N, O, S, and P.

As used herein, "(meth)acrylic" refers to acrylic and/or methacrylic.

As used herein, when a definition is not otherwise provided, "combination thereof" may refer to a mixture of constituents, copolymers, blends, alloys, complexes, reaction products, and the like.

Hereinafter, a separator for a rechargeable lithium battery according to an embodiment is described.

A separator for a rechargeable lithium battery according to an embodiment includes a porous substrate and a coating layer on one or both surfaces of the porous substrate.

The porous substrate may have a plurality of pore and may generally be a porous substrate used in an electrochemical device. Non-limiting examples of the porous substrate may be a glass fiber; or a polymer, a copolymer or a polymer film formed of a copolymer or a mixture of two or more selected from polyolefin such as polyethylene, polypropylene, and the like, a polyester such as polyethylene terephthalate, polybutylene terephthalate, and the like, polyacetal, polyamide, polyimide, polycarbonate, polyetheretherketone, polyaryletherketone, polyetherimide, polyamideimide, polybenzimidazole, polyethersulfone, polyphenyleneoxide, a cyclic olefin copolymer, polyphenylenesulfide, polyethylenenaphthalate, TEFLON (tetrafluoroethylene), and polytetrafluoroethylene. The above porous substrates are merely examples, and other porous substrates are also possible.

The porous substrate may be for example a polyolefin-based substrate, and the polyolefin-based substrate may improve has safety of a battery due to its improved shutdown function. The polyolefin-based substrate may be for example selected from a polyethylene single film, a polypropylene single film, a polyethylene/polypropylene double film, a polypropylene/polyethylene/polypropylene triple film, and a polyethylene/polypropylene/polyethylene triple film. In addition, the polyolefin-based resin may include a non-olefin resin in addition to an olefin resin or a copolymer of olefin and a non-olefin monomer. The above porous substrates are merely examples, and other porous substrates are also possible.

The porous substrate may have a thickness of about 1 μm to about 40 μm, for example about 1 μm to about 30 μm, about 1 μm to about 20 μm, about 5 μm to about 15 μm, or about 10 μm to about 15 μm. The above thicknesses are merely examples, and other thicknesses are also possible.

The coating layer according to an embodiment may be formed from a coating layer composition comprising a heat-resistant binder, hydroxy group-containing polyimide particles, a functional group-containing silane cross-linking agent, and a solvent.

The coating layer composition includes a heat-resistant binder, hydroxy group-containing polyimide particles, a functional group-containing silane cross-linking agent, and a solvent.

Figure 2:
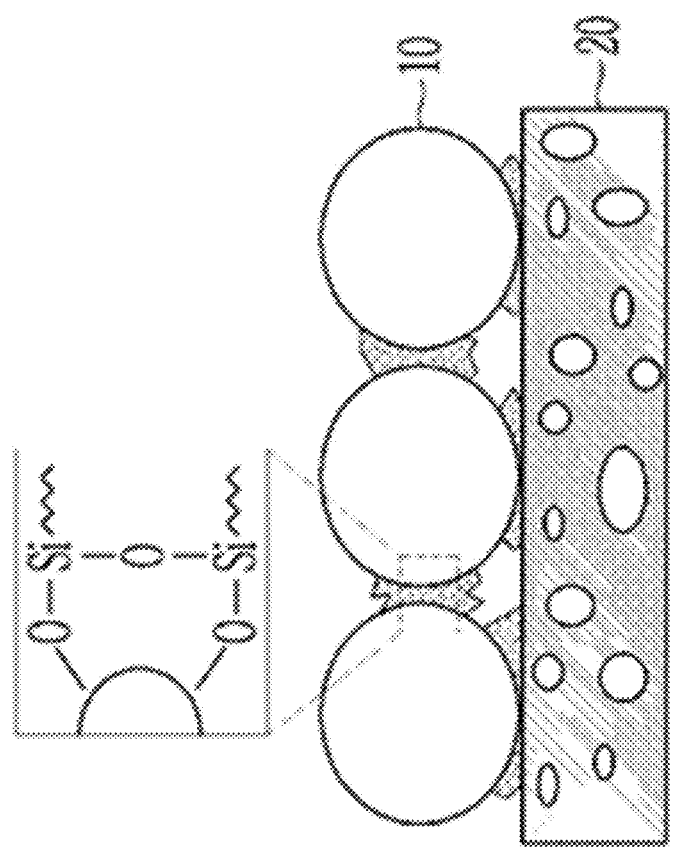
FIG. 2 is a schematic view of a separator for a rechargeable lithium battery according to an embodiment of the present disclosure.

In the coating layer composition according to an embodiment, as shown in FIG. 2, the hydroxy group-containing polyimide particles may be connected by the functional group-containing silane cross-linking agent.

Figure 3:
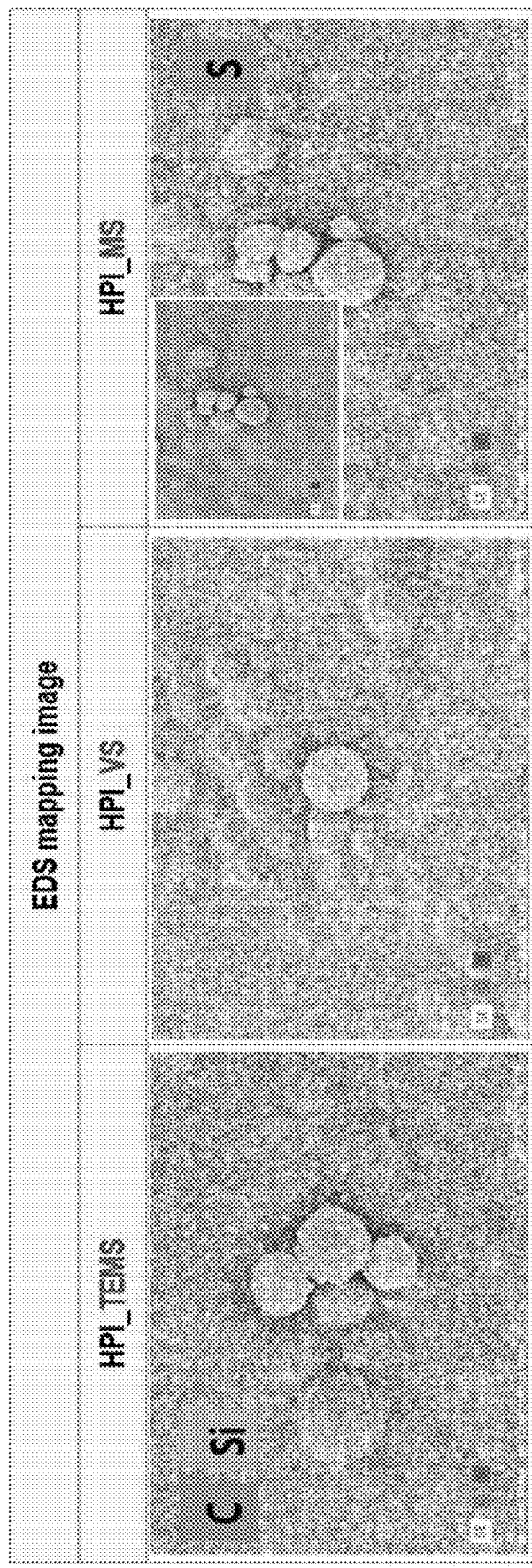
FIG. 3 is an energy dispersive spectroscopy (EDS) mapping image of organic particles having a core-shell structure formed from a coating layer composition according to an embodiment.

In the coating layer composition according to another embodiment, as shown in FIG. 3, the hydroxy group-containing polyimide particles and the functional group-containing silane cross-linking agent may form core-shell structured organic particles. The organic particles may be in a form including a core portion derived from the hydroxy group-containing polyimide particles, and a shell portion on the surface of the core portion, the shell portion being derived from the functional group-containing silane cross-linking agent. The coating layer formed from the coating layer composition including the core-shell structured organic particles may be formed by photo-cross-linking by UV irradiation or thermal cross-linking by heating after coating the coating composition to the porous substrate.

The core-shell structured organic particles may have a particle diameter of about 100 nm to about 1000 nm. Specifically, the core-shell structured organic particles may have a particle diameter of about 300 nm to about 850 nm, and more specifically, the core-shell structured organic particles may have a particle diameter of about 500 nm to about 750 nm. The above diameters are merely examples, and other diameters are also possible.

In the present specification, the particle diameter means an average particle diameter, and means a particle size (D50) at 50 volume % in a cumulative size-distribution curve.

When the particle diameter of the core-shell structured organic particles is within the above range, it may be more advantageous to secure heat resistance.

The hydroxy group-containing polyimide particles may be included in the coating layer while maintaining a spherical or pseudo-spherical shape as an organic material different from the heat-resistant binder.

The hydroxy group-containing polyimide particles may include, for example, a structural unit represented by Chemical Formula 1.

[Chemical Formula 1]

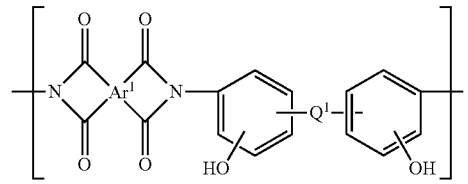

In Chemical Formula 1, $Ar^1$ is an aromatic cyclic group selected from a substituted or unsubstituted tetravalent C6 to C30 arylene group and a substituted or unsubstituted tetravalent C4 to C30 heterocyclic group, the aromatic ring group may be present alone, two or more may be fused to each other to form a condensed ring, or two or more may be linked by a functional group of single bonds, O, S, C(=O), CH(OH), S(=O)$_2$, Si(CH$_3$)$_2$, (CH$_2$)$_p$ (wherein 1≤p≤10), (CF$_2$)$_q$ (wherein, 1≤q≤10), C(CH$_3$)$_2$, C(CF$_3$)$_2$, or C(=O)NH, and $Q^1$ is a single bond, O, S, C(=O), CH(OH), S(=O)$_2$, Si(CH$_3$)$_2$, (CH$_2$)$_p$(wherein, 1≤p≤10), (CF$_2$)$_q$ (wherein, 1≤q≤10), or a substituted or unsubstituted phenylene group, C(CH$_3$)$_2$, C(CF$_3$)$_2$, or C(=O)NH.

For example, Chemical Formula 1 may be represented by one of Chemical Formulas 1A to 1 D, depending on the specific linking point of $Q^1$.

[Chemical Formula 1A]

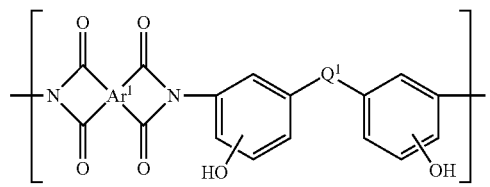

[Chemical Formula 1B]

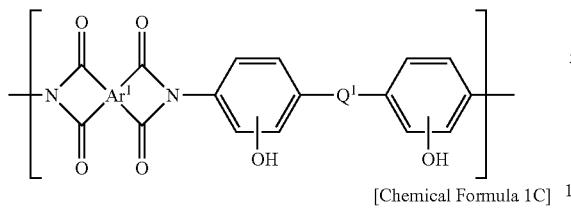

[Chemical Formula 1C]

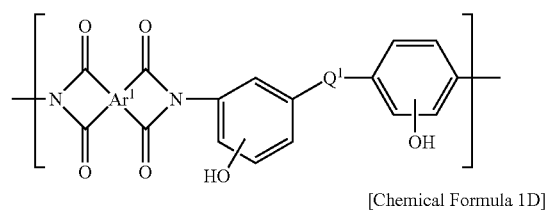

[Chemical Formula 1D]

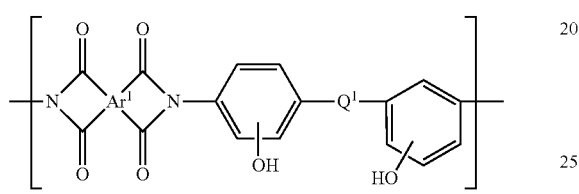

In Chemical Formulas 1A to 1D, the definitions of $Ar^1$ and $Q^1$ are the same as described above.

For example, the hydroxy group-containing polyimide particle according to an embodiment may be represented by Chemical Formula 1B.

As a more specific example, Chemical Formula 1B may be represented by Chemical Formula 1B-1 or 1B-11, depending on the linking point of the hydroxy group.

[Chemical Formula 1B-I]

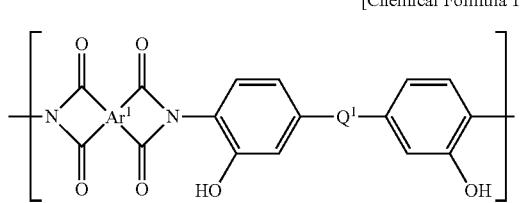

[Chemical Formula 1B-II]

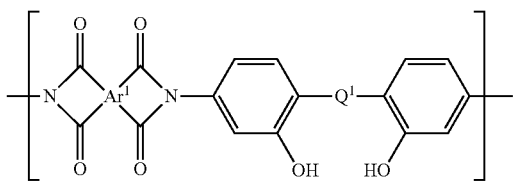

In Chemical Formulas 1B-I and 1B-II, the definitions of $Ar^1$ and $Q^1$ are the same as described above.

In an embodiment, Chemical Formula 1 may be represented by Chemical Formula 1-1.

[Chemical Formula 1-1]

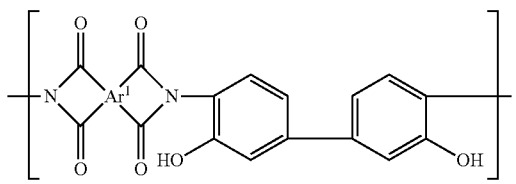

In Chemical Formula 1-1, $Ar^1$ is the same as described above.

In a specific embodiment, Chemical Formula 1 may be represented by Chemical Formula 1-2.

[Chemical Formula 1-2]

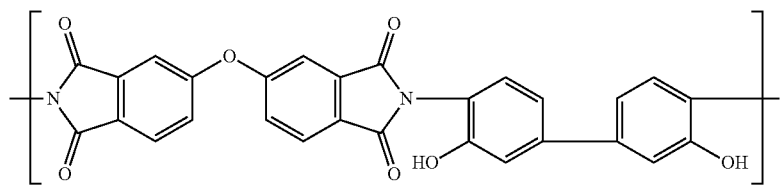

For example, the hydroxy group-containing polyimide particles according to an embodiment may include a structural unit represented by Chemical Formula 1B-I, for example, Chemical Formula 1-1, and more specifically Chemical Formula 1-2. In this way, when the hydroxy group includes a structural unit positioned at an ortho position with respect to the N of the imide, a polymerization conversion rate is particularly high, and a mechanical strength after the polymer is prepared may be further improved.

In a specific embodiment, the hydroxy group-containing polyimide particles may include a polyimide copolymer further including a structural unit represented by Chemical Formula 2. The polyimide copolymer may be selected from, for example, a polyimide random copolymer, a polyimide block copolymer, or a combination thereof, according to a polymerization method.

[Chemical Formula 2]

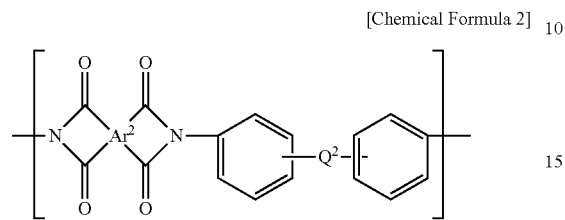

In Chemical Formula 2,
$Ar^2$ is an aromatic cyclic group selected from a substituted or unsubstituted tetravalent C6 to C30 arylene group and a substituted or unsubstituted tetravalent C4 to C30 heterocyclic group,
the aromatic ring group may be present alone, two or more may be fused to each other to form a condensed ring, or two or more may be linked by a functional group of single bonds, O, S, C(=O), CH(OH), S(=O)$_2$, Si(CH$_3$)$_2$, (CH$_2$)$_p$ (wherein 1≤p≤10), (CF$_2$)$_q$ (wherein, 1≤q≤10), C(CH$_3$)$_2$, C(CF$_3$)$_2$, or C(=O)NH, and
$Q^2$ is O, S, C(=O), CH(OH), S(=O)$_2$, Si(CH$_3$)$_2$, (CH$_2$)$_p$ (wherein, 1≤p≤10), (CF$_2$)$_q$ (wherein, 1≤q≤10), or a substituted or unsubstituted phenylene group, C(CH$_3$)$_2$, C(CF$_3$)$_2$, or C(=O)NH.
$Ar^1$ and $Ar^2$ in Chemical Formula 1 and Chemical Formula 2 may each independently be one selected from specific examples of the moieties of Group I.

[Group I]

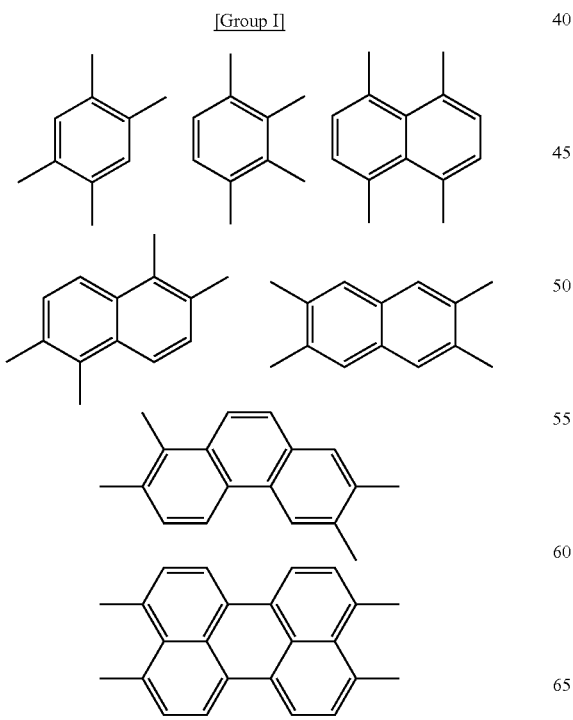

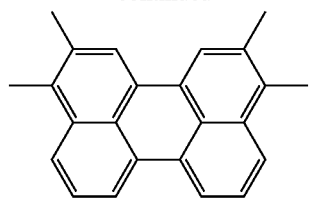

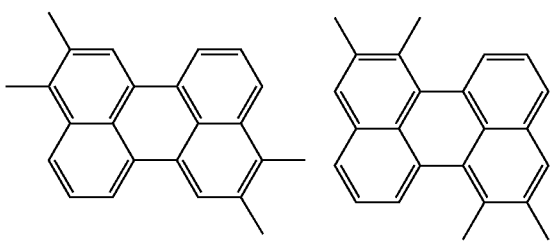

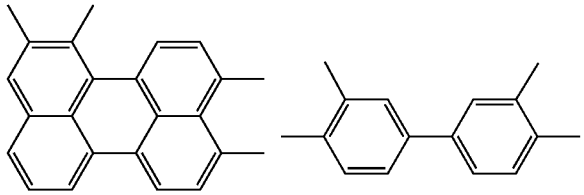

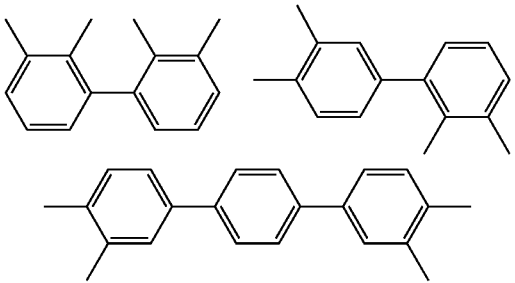

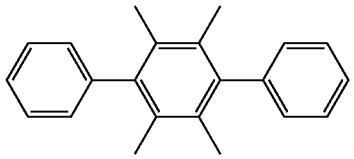

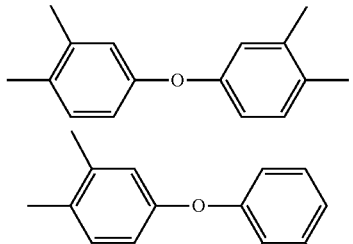

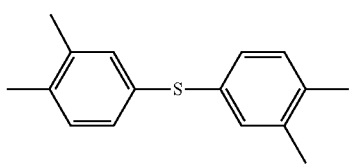

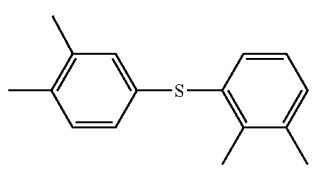

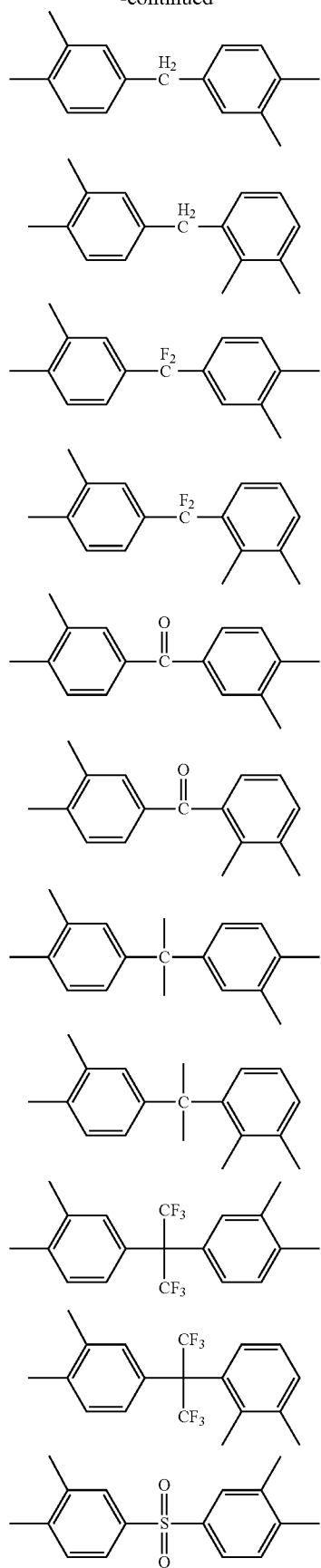
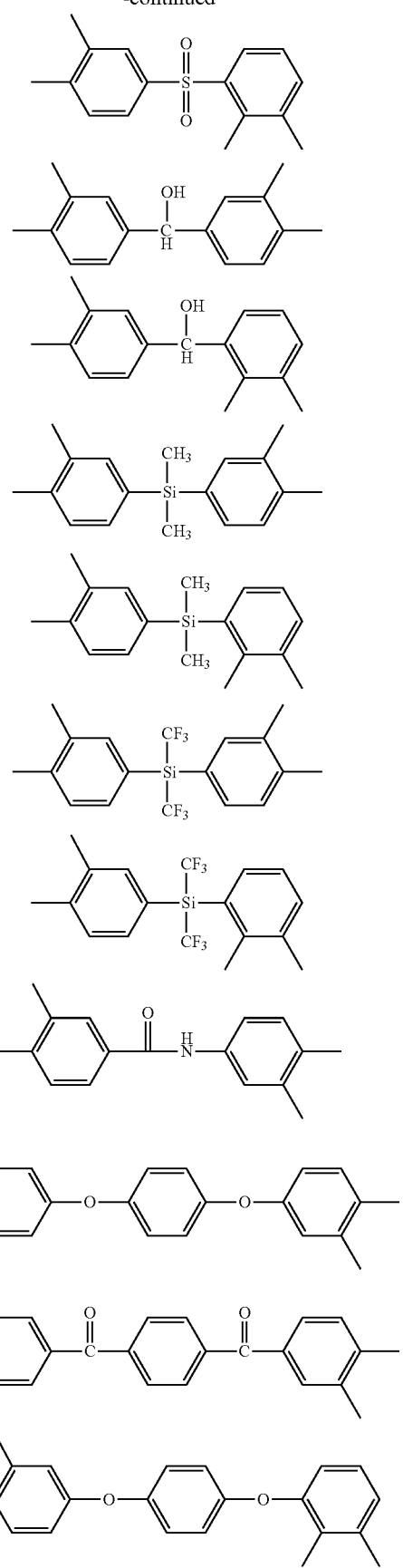

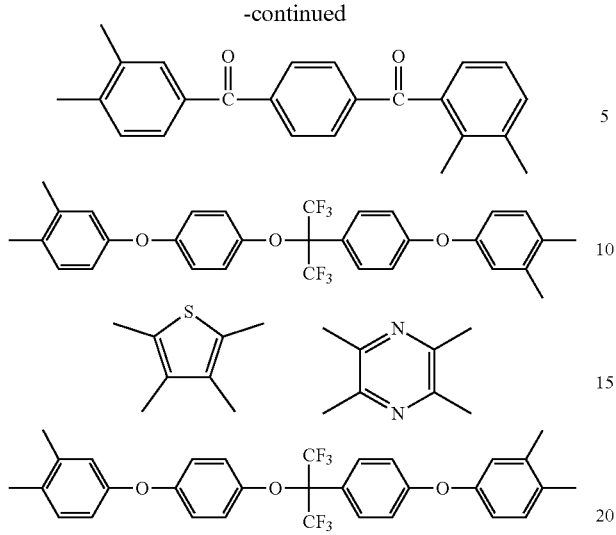
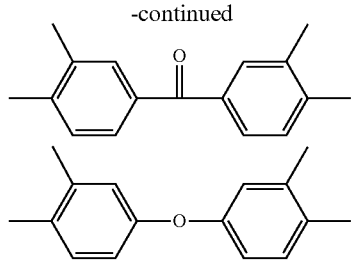

Specific examples of $Q^1$ and $Q^2$ in Chemical Formula 1 and Chemical Formula 2 may each independently be selected from $C(CH_3)_2$, $C(CF_3)_2$, O, S, $S(=O)_2$, or $C(=O)$.

For example, the polyimide copolymer may be a polyimide random copolymer.

For example, the polyimide copolymer may be a polyimide block copolymer.

The polyimide block copolymer may include a structural unit represented by Chemical Formula 1-3.

[Chemical Formula 1-3]

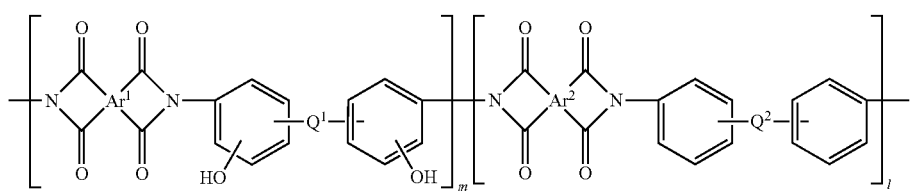

In Chemical Formula 1-3,
$Ar^1$, $Ar^2$, $Q^1$, and $Q^2$ are the same as described above, $10 \le m \le 400$, $10 \le l \le 400$, and
a mole ratio of m:l is about 9:1 to about 1:9.

The polyimide block copolymer may include a structural unit represented by Chemical Formula 1-4.

[Chemical Formula 1-4]

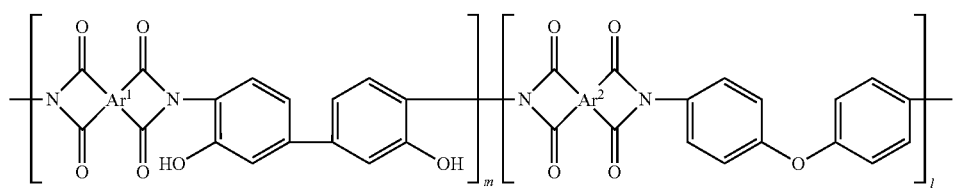

In Chemical Formula 1-4, $Ar^1$, $Ar^2$, m, and l are the same as described above.

The polyimide block copolymer may include a structural unit represented by Chemical Formula 1-5 as a specific example.

[Chemical Formula 1-5]

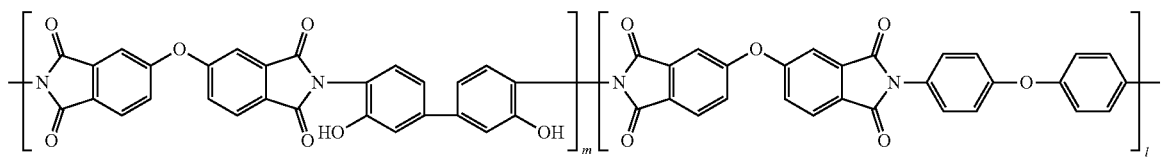

In Chemical Formula 1-5, m and l are the same as described above.

The mole ratio of m:l in the structural unit may be about 6:4 to about 4:6.

When the mole ratio of the structural unit is within the above range, improved solubility may be implemented.

In an example embodiment, the hydroxy group-containing polyimide particle may have a weight average molecular weight of about 100,000 to about 5,000,000, for example about 100,000 to about 2,000,000. The above molecular weights are merely examples, and other molecular weights are also possible.

When the molecular weight is within the above range, solubility and heat resistance to a solvent may be improved.

The hydroxy group-containing polyimide particles may be prepared by a reprecipitation method in which a poor solvent is added dropwise to a hydroxy group-containing polyimide polymer solution to precipitate particles.

In general, a poor solvent is one in which the solute (in this case the isolated polymer chain) precipitates. A solute precipitates out of solution so as to avoid energetically unfavourable solute-solvent interactions.

In general, polyimides that do not include a hydroxy group have low solubility in a solvent, so polyamic acid particles should be precipitated from a polyamic acid solution and then prepared through a chemical imidization reaction such as heat treatment.

On the contrary, the hydroxy group-containing polyimide (HPI) has high solubility in a poor solvent and may be prepared by directly adding the poor solvent to the polymer solution of the polyimide, and it does not require a separate chemical treatment for imidization, which is efficient in terms of reaction economy.

Meanwhile, the reprecipitation method according to an embodiment of the present disclosure may be a backward titillation method in which a poor solvent is added to a polymer solution, but is not limited thereto. For example, the reprecipitation method may be a forward titillation method in which a polymer solution is added to a poor solvent.

As an example of the polyimide polymer provided for the production of the hydroxy group-containing polyimide particles, the hydroxy group-containing polyimide including the structural unit represented by Chemical Formula 1 will be described. It may be obtained by reacting an anhydride including $Ar^1$ and a diamine including a hydroxy group in a solvent to prepare a polyamic acid, and chemically imidizing the polyamic acid.

The hydroxy group-containing polyimide particles according to an embodiment of the present disclosure may be selected from a random copolymer, a block copolymer, and a combination thereof according to a polymerization method.

As a specific example, the polyimide random copolymer including the structural unit represented by Chemical Formula 1 and the structural unit represented by Chemical Formula 2 may be produced by chemical imidization of a polyamic acid random copolymer obtained by polymerizing an anhydride including $Ar^1$, a first diamine including a hydroxy group, an anhydride including $Ar^2$, and second diamine in a solvent.

The solvent may be used without limitation, as long as it is a solvent commonly used in the production of polyamic acid, for example, dimethylformamide (DMF), dimethyl sulfoxide (DMSO), dimethylacetamide (DMAc), dimethyl carbonate (DMC) or N-methylpyrrolidone (NMP), and the like, and these may be used alone or in combination of two or more. The above solvents are merely examples, and other solvents are also possible.

The method for preparing the polyamic acid may be used without limitation as long as it is a conventional method known in the art.

Non-limiting examples of the anhydride including $Ar^1$ and the anhydride including $Ar^2$ may include pyromellitic dianhydride, 4,4'-(hexafluoroisopropylidene)diphthalic dianhydride, 3,3',4,4'-benzophenone tetracarboxylic dianhydride, 4,4'-carbonyldiphthalic anhydride, 1,2,3,4-butane tetracarboxylic dianhydride, 4,4'-oxydiphthalic dianhydride, 3,3',4,4'-biphenyl tetracarboxylic dianhydride, bicyclo[2.2.2]oct-7-ene-2,3,5,6-tetracarboxylic dianhydride, 3,3',4,4'-diphenylsulfone tetracarboxylic dianhydride, 4,4'-isopropylidenediphthalic dianhydride, 1,2,4,5-cyclohexane tetracarboxylic dianhydride, 1,2,3,4-cyclopentane tetracarboxylic dianhydride, and the like.

The above anhydrides are merely examples, and other anhydrides are also possible.

The anhydride including $Ar^1$ and the anhydride including $Ar^2$ may be the same or different.

The first diamine may be, for example, 3,3'-dihydroxy-4,4'-diaminobiphenyl.

Non-limiting examples of the second diamine may include 3,3'-diaminodiphenylsulfone, 4,4'-diaminodiphenylsulfone, 1,6-hexamethylenediamine, 4,4'-oxydianiline, 4,4'-methylenedianiline, 1,3-phenylenediamine, 1,4-phenylenediamine, 2,2-bis(3-amino-4-methylphenyl)hexafluoropropane, meta-xylenediamine, para-xylenediamine, 3,3'-(hexafluoroisopropylidene)dianiline, 4,4'-(hexafluoroisopropylidene)dianiline, 3-[3-(3-aminophenyl)sulfonylphenyl]sulfonylaniline, 2,2'-bis(trifluoromethyl)benzidine, 1,16-hexadecanediamine, 1,4-cyclohexyldiamine, 3,3'-bis(trifluoromethyl)benzidine, ortho-tolidine, 2,3,5,6-tetramethyl-1,4-phenylenediamine, 2,5-dimethyl-1,4-phenylenediamine, 4,4'-diamino-3,3'-dimethyldiphenylmethane, 2,2-bis[4-(4-aminophenoxy)phenyl]hexafluoropropane, and the like. The above diamines are merely examples, and other diamines are also possible.

A mole ratio of each structural unit in the polyimide copolymer may be adjusted according to amounts of the first diamine and the second diamine added, and may be about 6:4 to about 4:6 in terms of improving solubility in a solvent and heat resistance. The above molar ratios are merely examples, and other molar ratios are also possible.

After dissolving the prepared polyimide in a hydrophilic organic solvent to prepare a polyimide solution of about 1 wt % to about 10 wt %, a surfactant is added so that a weight ratio of the polyimide:surfactant may be about 3:1 to about 1:3 and stirred, and thereby the polyimide may be controlled to have a more spherical shape. The above wt % and weight ratios are merely examples, and other wt % and weight ratios are also possible.

The hydrophilic organic solvent may be, for example, N-methylpyrrolidone, and the surfactant may be, for example, polyvinylpyrrolidone. The above hydrophilic organic solvents are merely examples, and other hydrophilic organic solvents are also possible.

The reaction may be performed at a temperature of about −10° C. to about 25° C., and the stirring may be performed by magnetic stirring, ultrasonic stirring, or the like. The above temperatures and stirring methods are merely examples, and other temperatures and stirring methods are also possible.

When the reaction is performed under the aforementioned condition, the hydroxy group-containing polyimide particles may have a diameter of about 100 nm to about 1000 nm and specifically, about 500 nm to about 750 nm. The above diameters are merely examples, and other diameters are also possible.

When the hydroxy group-containing polyimide particles have a diameter within the ranges, heat resistance may be secured.

Subsequently, about 50% to about 100% of a poor solvent based on the total volume of the mixed solution prepared by using the hydrophilic organic solvent may be injected thereinto.

The poor solvent may be, for example, water.

The poor solvent may be, for example, injected at about 10 ml/hr to about 30 ml/hr based on about 1 L of the polymer solution.

The injection process is performed to smoothly perform the following washing process without depositing a polymer, and the water should be injected in at least about ½ volume of the mixed solution.

Subsequently, a mixed solvent of water:ethanol in a weight ratio of about 1:1 is used to perform the washing process, and the water is removed through centrifugation to obtain hydroxy group-containing polyimide particles controlled in a spherical shape.

The washing process is at least about 5 times or about 5 times to about 10 times performed. The above numbers are merely examples, and other numbers are also possible.

In addition, the centrifugation may be performed at about 0° C. to about 5° C. at about 8,000 rpm to about 10,000 rpm for about 30 minutes to about 60 minutes. The above values are merely examples, and other values are also possible.

The obtained hydroxy group-containing polyimide particles are dried at about 80° C. to about 120° C. in a vacuum oven overnight and obtained in a final dried powder state. The above temperatures are merely examples, and other temperatures are also possible.

On the other hand, in order to form a coating layer including the core-shell structured organic particles, a coating step for coating the hydroxy group-containing polyimide particles obtained in the powder state with a functional group-containing silane cross-linking agent may be additionally performed, subsequently following the above steps.

The coating step may be performed by dispersing about 1 wt % to about 10 wt % of the hydroxy group-containing polyimide particles based on the total dispersion in the mixed solvent of water:ethanol=1:1 (w/w) and then, mixing 0.5 and more than about 0.5 parts by weight to about less than about 20 parts by weight of the functional group-containing silane cross-linking agent based on 100 parts by weight of the hydroxy group-containing polyimide particles therewith. The above wt %, w/w, and parts by weight are merely examples, and other wt %, w/w, and parts by weight are also possible.

The coated particles may be obtained by stirring a coating layer composition including the hydroxy group-containing polyimide particles, the functional group-containing silane cross-linking agent, and a solvent at about 80° C. to about 100° C. overnight. The above temperatures are merely examples, and other temperatures are also possible.

When the functional group-containing silane cross-linking agent is included in an amount of less than about 0.5 parts by weight to about 20 parts by weight based on 100 parts by weight of the hydroxy group-containing polyimide particles, the particles may be uniformly dispersed without agglomeration. The above parts by weight are merely examples, and other parts by weight are also possible.

In this regard, referring to FIGS. 3 and 4, a dispersion degree of the coating layer composition and whether or not a shell portion is coated may be examined.

FIG. 3 is an EDS mapping image of hydroxyl group-containing polyimide (HPI) organic particles having a core-shell structure formed from a coating layer composition according to an embodiment.

Referring to FIG. 3, the shell portion derived from the functional group-containing silane cross-linking agent is coated on the surface of a core portion derived from the hydroxy group-containing polyimide particles.

For example, in FIG. 3, the first image is an EDS mapping image of hydroxyl group-containing polyimide (HPI) organic particles of TEMS (TriEthoxyMethylSilane). 'C' and 'Si' respectively stand for carbon and silicon of TEMS.

For example, in FIG. 3, the second image is an EDS mapping image of hydroxyl group-containing polyimide (HPI) organic particles of VS (VinyltrimethoxySilane).

For example, in FIG. 3, the third image is an EDS mapping image of hydroxyl group-containing polyimide (HPI) organic particles of MS ((3-Mercaptopropyl)trimethoxySilane). 'S' stands for sulfur of MS.

Figure 4A:
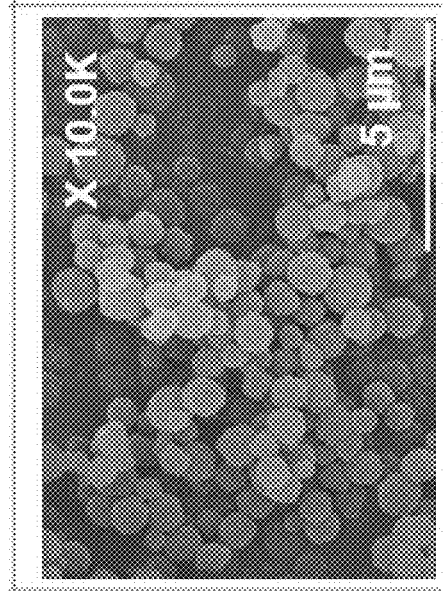
FIGS. 4A, 4B, and 4C are example transmission electron microscopy (TEM) photographs of organic particles formed from coating layer compositions according to examples and comparative examples.
Figure 4B:
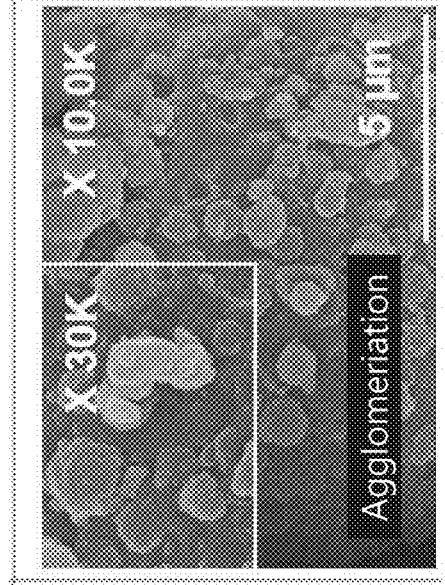
Figure 4C:
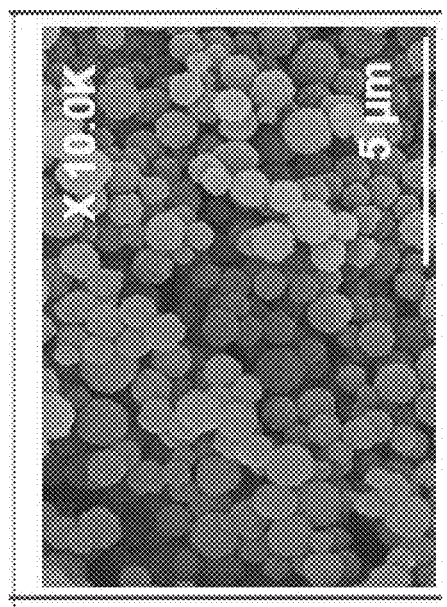

FIGS. 4A, 4B, and 4C are a TEM photograph of organic particles formed from coating layer compositions according to examples and comparative examples.

Referring to FIGS. 4A, 4B, and 4C, when the functional group-containing silane cross-linking agent is included at a high concentration (about 20 parts by weight) based on about 100 parts by weight of the hydroxy group-containing polyimide particles (FIG. 4B), the particles are agglomerated, compared with the dispersion of the hydroxy group-containing polyimide particles (FIG. 4A), but when the functional group-containing silane cross-linking agent is included at a low concentration (about 1 part by weight), the particles are evenly dispersed without agglomeration (FIG. 4C).

The mixed solution may be centrifuged to remove the water at about 8,000 rpm to about 10,000 rpm for about 30 minutes to about 60 minutes and thus obtain the core-shell structured organic particle having the core portion derived from the hydroxy group-containing polyimide particles and the shell portion on the surface of the core portion and derived from the functional group-containing silane cross-linking agent. The above centrifugation conditions are merely examples, and other centrifugation conditions are also possible.

Under such a condition, the core portion derived from the hydroxy group-containing polyimide particles may have a particle diameter of about 70 nm to about 970 nm. The above particle diameters are merely examples, and other particle diameters are also possible.

In addition, the shell portion on the surface of the core portion and derived from the functional group-containing silane cross-linking agent may have a particle diameter of about 5 nm to about 50 nm and specifically, about 5 nm to about 30 nm. The above particle diameters are merely examples, and other particle diameters are also possible. Herein, the shell portion indicates the other portion excluding the core portion in the core-shell structured organic particle.

When the shell portion has a particle diameter within the range, an additional cross-linking reaction between a hydroxy group in the core portion and a functional group included in the shell portion may be expected.

Specifically, the hydroxy group and the functional group may contribute to forming the additional cross-linking bond with a porous substrate as well as a core-shell bond and thus realize a separator with much enhanced heat resistance.

The heat-resistant binder:hydroxy group-containing polyimide particle may be included in a weight ratio of about 1:20 to about 1:40, for example about 1:25 to about 1:40, or about 1:25 to about 1:35. The above weight ratios are merely examples, and other weight ratios are also possible.

The heat-resistant binder:the core-shell structured organic particle may be a weight ratio of about 1:20 to about 1:40, for example about 1:20 to about 1:35, or about 1:20 to about 1:30. The above weight ratios are merely examples, and other weight ratios are also possible.

When the hydroxy group-containing polyimide particles or the core-shell structured organic particles in the aforementioned content along with the heat-resistant binder is included in the coating layer, a separator having excellent heat resistance and air permeability may be realized.

In other words, heat resistance, durability, and safety of the separator may be improved by preventing rapid contraction and deformation due to a temperature rise.

Since these effects may be obtained without using inorganic particles, and the additional cross-linking reaction of the hydroxy group contained in the hydroxy group-containing polyimide particles may derive a bond of the porous substrate and the polyimide particles, a bond of the heat-resistant binder and the polyimide particles, and a bond of the silane cross-linking agent and the polyimide particles, greatly improved adhesion may be secured, compared with when the inorganic particles are used.

The additional cross-linking reaction of the hydroxy group contained in the hydroxy group-containing polyimide particles with the functional group-containing silane cross-linking agent or a cross-linking reaction of the core portion derived from the hydroxy group-containing polyimide particles and the shell portion derived from the functional group-containing silane cross-linking agent may form, for example, a cross-linked product represented by Chemical Formula 3.

FIG. 2 is a schematic view of a separator for a rechargeable lithium battery according to an embodiment of the present disclosure.

Referring to FIG. 2, an additional cross-linking derived from hydroxy group-containing polyimide particles 10 is expected to improve adhesion among the polyimide particles and between a porous substrate 20 and the polyimide particles in the separator.

The silane cross-linking agent may organically connect the hydroxy group-containing polyimide particles, the heat-resistant binder, and the porous substrate, thereby improving heat resistance of the separator and improving adhesion between the substrate and the electrode.

The functional group may be at least one of a hydroxy group, an alkoxy group, a halogen group, an amino group, a vinyl group, and a glycidoxy group.

The functional group of the silane cross-linking agent may react with at least one of a hydroxyl group of the hydroxy group-containing polyimide and a functional group in the heat-resistant binder described later.

Specific examples of the functional group-containing silane cross-linking agent may include at least one selected from alkylalkoxysilane, vinylalkoxysilane, glycidoxyalkylalkoxysilane, aminoalkylalkoxysilane, mercaptoalkylalkoxysilane, halogenated alkylalkoxysilane, vinylhalosilane, and alkylacyloxy. silane, but the present disclosure is not limited thereto. The above functional group-containing silane cross-linking agents are merely examples, and other functional group-containing silane cross-linking agents are also possible.

More specific examples of the functional group-containing silane cross-linking agent may include at least one selected from triethoxymethylsilane, vinyl trimethoxysilane, and (3-mercaptopropyl)trimethoxysilane. The above functional group-containing silane cross-linking agents are merely examples, and other functional group-containing silane cross-linking agents are also possible.

[Chemical Formula 3]

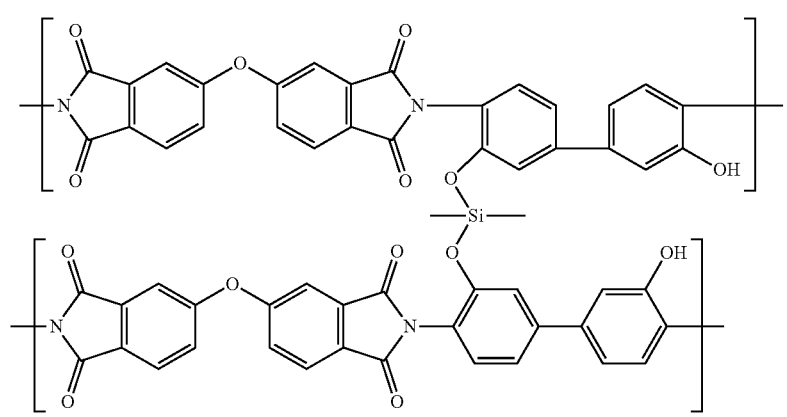

The cross-linked product represented by Chemical Formula 3 may further improve adhesion among the hydroxy group-containing polyimide particles and/or between the hydroxy group polyimide particles and the substrate, and between the heat-resistant binder and the substrate due to the hydroxy group and the functional group included in the silane cross-linking agent.

The functional group-containing silane cross-linking agent may be included in an amount of about 0.5 wt % to about 10 wt %, specifically about 1 wt % to about 10 wt % or about 2 wt % to about 10 wt % based on a total solid weight of the coating layer composition. The above wt % are merely examples, and other wt % are also possible.

When it is included within the above range, sufficient cross-linking bonds may be induced and heat resistance may be obtained.

The functional group-containing silane cross-linking agent may be included in an amount of about 0.5 to 20 parts by weight, specifically about 0.5 to 10 parts by weight, for example, about 1 to 5 parts by weight, or about 1 to 3 parts by weight based on 100 parts by weight of the hydroxy group-containing polyimide particles. The above amounts are merely examples, and other amounts are also possible. When it is included within the above range, sufficient cross-linking bonds may be induced and heat resistance may be obtained.

The heat-resistant binder is not particularly limited as long as it does not cause phase separation in the coating slurry. For example, it may include polymers including structural units derived from (meth)acrylic compounds, polyurethane (PU), polyimide (PI), polyetherimide (PEI), polyvinyl alcohol (PVA), polyacrylic acid (PAA), polyacrylonitrile (PAN), polytetrafluoroethylene (PTFE), polyamide-imide (PAI), polyetheretherketone (PEEK), polyether sulfone (PES), and polyphenylene sulfide (PPS). The above heat-resistant binders are merely examples, and other heat-resistant binders are also possible.

For example, the heat-resistant binder may include a (meth)acrylic copolymer including a first structural unit derived from (meth)acrylamide; a second structural unit derived from (meth)acrylic acid, (meth)acrylate or (meth)acrylonitrile; and a third structural unit derived from (meth)acrylamidosulfonic acid or a salt of (meth)acrylamidosulfonic acid. The above heat-resistant binders are merely examples, and other heat-resistant binders are also possible.

The first structural unit may be included in an amount of about 55 mol % to about 90 mol % based on 100 mol % of the (meth)acrylic copolymer, and the second structural unit and the third structural unit may each independently included in an amount of about 5 mol % to about 40 mol % based on 100 mol % of the (meth)acrylic copolymer. The above mol % are merely examples, and other mol % are also possible.

In a specific embodiment, the second structural unit may be included in an amount of about 5 mol % to about 40 mol % based on 100 mol % of the (meth)acrylic copolymer, and the third structural unit may be included in an amount of about 5 mol % to about 10 mol % based on 100 mol % of the (meth)acrylic copolymer. The above mol % are merely examples, and other mol % are also possible.

In a more specific embodiment, the first structural unit may be included ed in an amount of about 80 mol % to about 85 mol % based on 100 mol % of the (meth)acrylic copolymer, the second structural unit may be included in an amount of about 10 mol % to about 15 mol % based on 100 mol of the (meth)acrylic copolymer, and the third structural unit may be included in an amount of about 5 mol % to about 10 mol % based on 100 mol % of the (meth)acrylic copolymer. The above mol % are merely examples, and other mol % are also possible.

When the content of each structural unit is within the above range, heat resistance and adhesion of the separator may be further improved.

For example, the (meth)acrylic copolymer may include a first structural unit derived from (meth)acrylamide, a second structural unit derived from (meth)acrylic acid or (meth)acrylate, or a third structural unit derived from (meth)acrylamidosulfonic acid or a salt of (meth)acrylamidosulfonic acid. The above structural units are merely examples, and other structural units are also possible.

For example, the (meth)acrylic copolymer may include a first structural unit derived from (meth)acrylamide, a second structural unit derived from (meth)acrylonitrile, and a third structural unit derived from (meth)acrylamidosulfonic acid or a salt thereof. The above structural units are merely examples, and other structural units are also possible.

The first structural unit derived from the (meth)acrylamide may be, for example, represented by Chemical Formula 4.

[Chemical Formula 4]

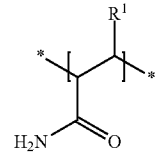

In Chemical Formula 4, $R^1$ is hydrogen or a C1 to C6 alkyl group.

The structural unit derived from the (meth)acrylic acid or (meth)acrylate may be, for example, represented by one of Chemical Formula 5, Chemical Formula 6, and a combination thereof.

[Chemical Formula 5]

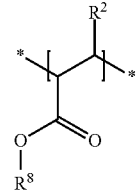

[Chemical Formula 6]

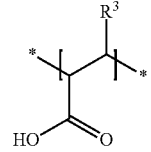

In Chemical Formulas 5 and 6, $R^2$ and $R^3$ are independently hydrogen or a C1 to C6 alkyl group, and $R^8$ is a substituted or unsubstituted C1 to C20 alkyl group.

The structural unit derived from (meth)acrylate may be derived from (meth)acrylic acid alkyl ester, (meth)acrylic acid perfluoroalkyl ester, and (meth)acrylate having a functional group in the side chain, such as (meth)acrylic acid alkyl ester. The above structural units are merely examples, and other structural units are also possible. In addition, the number of carbon atoms of the alkyl group or perfluoroalkyl group bonded to a noncarbonyl oxygen atom of the (meth)acrylic acid alkyl ester or (meth)acrylic acid perfluoroalkyl ester may be specifically 1 to 20, more specifically 1 to 10, for example, 1 to 5. The above numbers merely examples, and other numbers are also possible.

As specific examples of the (meth)acrylic acid alkyl ester having the alkyl group or perfluoroalkyl group bonded to the noncarbonyl oxygen atom having 1 to 5 carbon atoms may be acrylic acid alkyl ester such as methyl acrylate, ethyl acrylate, n-propyl acrylate, isopropyl acrylate, n-propyl acrylate, n-butyl acrylate, and t-butyl acrylate; 2-(perfluoroalkyl) ethyl acrylate such as 2-(perfluorobutyl) ethyl acrylate, and 2-(perfluoropentyl) ethyl acrylate; methacrylic acid alkylester such as methyl methacrylate, ethyl methacrylate, n-propyl methacrylate, isopropyl methacrylate, n-butyl methacrylate, and t-butyl methacrylate; and 2-(perfluoroalkyl) ethyl methacrylate such as 2-(perfluorobutyl) ethyl methacrylate, 2-(perfluoropentyl) ethyl methacrylate, and 2-(perfluoroalkyl) ethyl methacrylate. The above esters are merely examples, and other esters are also possible.

Other (meth)acrylic acid alkyl esters may include acrylic acid alkyl ester having 6 to 18 carbon atoms in the alkyl group bonded to the noncarbonyl oxygen atom such as n-hexyl acrylate, 2-ethylhexyl acrylate, nonyl acrylate, lauryl acrylate, stearyl acrylate, cyclohexyl acrylate, and isobornyl acrylate, and the like; methacrylic acid alkyl ester having 6 to 18 carbon atoms in the alkyl group bonded to the noncarbonyl oxygen atom such as n-hexyl methacrylate, 2-ethylhexyl methacrylate, octyl methacrylate, isodecyl methacrylate, lauryl methacrylate, tridecyl methacrylate, stearyl methacrylate, and cyclohexyl methacrylate, and the like; 2-(perfluoroalkyl) ethyl acrylate having 6 to 18 carbon atoms in the perfluoroalkyl group bonded to the noncarbonyl oxygen atom such as 2-(perfluorohexyl)ethyl acrylate, 2-(perfluorooctyl) ethyl acrylate, 2-(perfluorononyl) ethyl acrylate, 2-(perfluorodecyl) ethyl acrylate, 2-(perfluorododecyl) ethyl acrylate, 2-(perfluorotetradecyl) ethyl acrylate, 2-(perfluorohexadecyl) ethyl acrylate, and the like; 2-(perfluoroalkyl) ethyl methacrylate having 6 to 18 carbon atoms in the perfluoroalkyl group bonded to the noncarbonyl oxygen atom such as 2-(perfluorohexyl) ethyl methacrylate, 2-(perfluorooctyl) ethyl methacrylate, 2-(perfluorononyl) ethyl methacrylate, 2-(perfluorodecyl) ethyl methacrylate, 2-(perfluorododecyl) ethyl methacrylate, 2-(perfluorotetradecyl) ethyl methacrylate, 2-(perfluorohexadecyl) ethyl methacrylate, and the like. The above esters and carbon atom numbers are merely examples, and other esters and carbon atom numbers units are also possible.

For example, the structural unit derived from (meth)acrylic acid or (meth)acrylate may include a structural unit represented by Chemical Formula 5 and a structural unit represented by Chemical Formula 6, respectively or may include both of them. When they are included together, the structural unit represented by Chemical Formula 5 and the structural unit represented by Chemical Formula 6 may be included in a mole ratio of about 10:1 to about 1:1, desirably about 6:1 to about 1:1, and more desirably about 3:1 to about 1:1. The above mole ratios are merely examples, and other mole ratios are also possible.

The structural unit derived from the (meth)acrylonitrile may be, for example, represented by Chemical Formula 7.

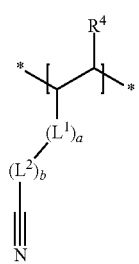

[Chemical Formula 7]

In Chemical Formula 7, $R^4$ may be hydrogen or a C1 to C6 alkyl group, and $L^1$ and $L^2$ may independently be a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group. The above groups are merely examples, and other groups are also possible.

The structural unit derived from the (meth)acrylonitrile may be, for example, a structural unit derived from (meth)acrylonitrile or cyanoalkyl (meth)acrylate. Herein, the alkyl may be C1 to C20 alkyl, C1 to C10 alkyl, or C1 to C6 alkyl. The above alkyls are merely examples, and other alkyls are also possible.

The cyanoalkyl (meth) acrylate may be, for example, cyanomethyl (meth) acrylate, cyanoethyl (meth) acrylate, cyanopropyl (meth) acrylate, or cyano octyl (meth) acrylate. The above are merely examples, and others are also possible.

The structural unit derived from the (meth)acrylamidosulfonic acid or a salt thereof may be a structural unit derived from (meth)acrylamidosulfonic acid or (meth)acrylamidosulfonate, and the (meth)acrylamidosulfonate may be a conjugate base of (meth)acrylamidosulfonic acid, a (meth) acrylamidosulfonate salt, or a derivative thereof. The above structural units are merely examples, and other structural units are also possible. The structural unit derived from the (meth)acrylamidosulfonic acid or (meth)acrylamidosulfonate may be represented by one of Chemical Formula 8, Chemical Formula 9, Chemical Formula 10, and a combination thereof.

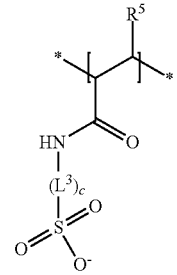

[Chemical Formula 8]

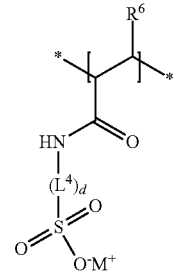

[Chemical Formula 9]

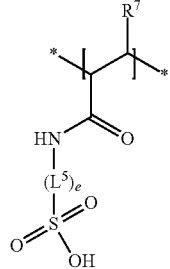

[Chemical Formula 10]

In Chemical Formulas 8 to 10, $R^5$, $R^6$, and $R^7$ may independently be hydrogen or a C1 to C6 alkyl group, $L^3$, $L^4$, and $L^5$ may independently be a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, c, d, and e may independently be an integer of 0 to 2, and M may be an alkali metal, wherein the alkali metal may be for example lithium, sodium, potassium, rubidium, or cesium.

For example, in Chemical Formulas 8 to 10, $L^3$, $L^4$, and $L^5$ may each independently be a substituted or unsubstituted C1 to C10 alkylene group, and c, d, and e may each be 1.

The structural unit derived from the (meth)acrylamidosulfonic acid or a salt thereof may include a structural unit represented by Chemical Formula 8, a structural unit represented by Chemical Formula 9, and a structural unit represented by Chemical Formula 10, respectively, or two or more types thereof. As an example, the structural unit represented by Chemical Formula 9 may be included, and as another example, the structural unit represented by Chemical Formula 9 and the structural unit represented by Chemical Formula 10 may be included together.

When the structural unit represented by Chemical Formula 9 and the structural unit represented by Chemical Formula 8 are included together, the structural unit represented by Chemical Formula 9 and the structural unit represented by Chemical Formula 10 may be included in a mole ratio of about 10:1 to about 1:2, desirably about 5:1 to about 1:1, and more desirably about 3:1 to about 1:1. The above mole ratios are merely examples, and other mole ratios are also possible.

The sulfonate group in the structural unit derived from the (meth)acrylamidosulfonic acid or a salt thereof may be, for example, a functional group derived from vinyl sulfonic acid, allyl sulfonic acid, styrene sulfonic acid, anethol sulfonic acid, acrylamidoalkane sulfonic acid, sulfoalkyl (meth)acrylate, or a salt thereof. The above functional groups are merely examples, and other functional groups are also possible.

Here, the alkane may be a C1 to C20 alkane, a C1 to C10 alkane, or a C1 to C6 alkane, and the alkyl may be a C1 to C20 alkyl, a C1 to C10 alkyl, or a C1 to C6 alkyl. The above alkanes are merely examples, and other alkanes are also possible. The salt refers to a salt composed of the aforementioned sulfonic acid and appropriate ions. The ions may be, for example, alkali metal ions, and in this case, the salt may be an alkali metal sulfonic acid salt.

The acrylamidoalkane sulfonic acid may be, for example, 2-acrylamido-2-methylpropane sulfonic acid, and the sulfoalkyl (meth)acrylate may be, for example, 2-sulfoethyl (meth)acrylate, 3-sulfo propyl (meth)acrylate, and the like. The above acrylamidoalkane sulfonic acids are merely examples, and other acrylamidoalkane sulfonic acids are also possible.

The (meth)acrylic copolymer may be, for example, represented by Chemical Formula 11 or Chemical Formula 1.

[Chemical Formula 11]

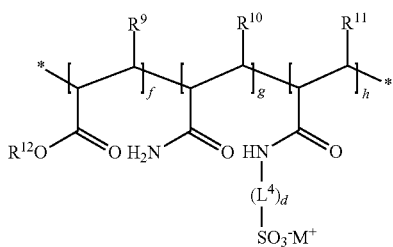

-continued

[Chemical Formula 12]

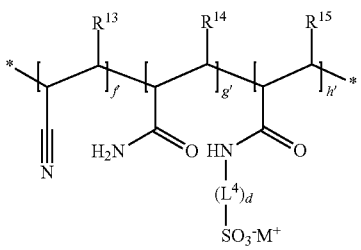

In Chemical Formulas 11 and 12, $R^9$ to $R^{11}$ and $R^{13}$ to $R^{15}$ may independently be hydrogen or a methyl group, $R^{12}$ may be hydrogen or a C1 to C6 alkyl group, $L^4$ may be a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, d may be one of integers of 0 to 2, M may be an alkali metal such as lithium, sodium, potassium, rubidium, or cesium, and the like, and f, g, h, f', g' and h' may indicate a mole ratio of each unit.

For example, in Chemical Formula 11, f+g+h=1. For example, 0.05≤(f+h)≤0.45, 0.55≤g≤0.95, specifically 0≤f≤0.4, and 0≤h≤0.1, for example 0.9≤g≤0.95, 0≤f≤0.05, and 0≤h≤0.05.

For example, in Chemical Formula 11, f'+g'+h'=1. In addition, for example, 0.05≤(f'+h')≤0.45, 0.55≤g'≤0.95, specifically 0≤f'≤0.4, and 0≤h'≤0.1, for example 0.9≤g'≤0.95, 0≤f'≤0.05, and 0≤h'≤0.05.

For example, in Chemical Formula 12, $L^4$ may be a substituted or unsubstituted C1 to C10 alkylene group, and d may be 1.

In the (meth)acrylic copolymer, a structural unit substituted with an alkali metal ($M^+$) may be present in an amount of about 50 mol % to about 100 mol %, for example, about 60 mol % to about 90 mol %, or about 70 mol % to about 90 mol % based on about 100 mol % of a total amount of the (meth)acrylamidosulfonic acid structural unit. The above mol % are merely examples, and other mol % are also possible.

When the range is satisfied, the (meth)acrylic copolymer and a separator including the same may exhibit excellent adhesion, heat resistance, and oxidation resistance.

The (meth)acrylic copolymer may further include other units in addition to the aforementioned units. For example, the (meth)acrylic copolymer may further include a unit derived from alkyl(meth)acrylate, a unit derived from dienes, a unit derived from styrenes, an ester group-containing unit, a carbonate group-containing unit, or a combination thereof.

The (meth)acrylic copolymer may have various types such as an alternating polymer in where the units are alternately distributed, a random polymer in which the units are randomly distributed, a graft polymer in which some structural units are grafted, or the like.

The (meth)acrylic copolymer may have a weight average molecular weight of about 300,000 to about 950,000, for example, about 450,000 to about 950,000, or about 450,000 to about 700,000. The above weight average molecular weights are merely examples, and other weight average molecular weights are also possible. When the (meth)acrylic copolymer has a weight average molecular weight within the range, the (meth)acrylic copolymer and a separator including the same may exhibit excellent adhesion, heat resistance, and air permeability. The weight average molecular weight may be an average molecular weight, reduced to polystyrene, which is measured by using gel transmission chromatography.

The (meth)acrylic copolymer may be prepared in well-known various methods such as an emulsion polymerization, a suspension polymerization, a massive polymerization, a solution polymerization, a bulk polymerization, or the like.

On the other hand, the coating layer composition may further include additives such as a polymerization initiator, a molecular weight-adjusting agent, an emulsifier, a pH-adjusting agent, and the like.

Examples of the polymerization initiator may use a water-soluble initiator such as persulfate and the like, an oil-soluble initiator such as benzoyl peroxide and the like, and the like.

Examples of the molecular weight-adjusting agent may include mercaptans such as t-dodecyl mercaptan, n-dodecyl mercaptan, and the like; α-methylstyrene dimer; sulfides such as dimethyl xanthene disulfide, diisopropyl xanthene disulfide, and the like; a nitrile compound such as 2-methyl-3-butenenitrile, 3-pentenenitrile, and the like, which may be used as a single or a mixture of two or more. The above agents are merely examples, and other agents are also possible.

Examples of the emulsifier may include an anionic surfactant, a non-ionic surfactant, and the like, which may be used alone or as a combination, and in addition, a reactive surfactant, protective colloid, and the like may be used.

The pH-adjusting agent may be added in order to promote a cross-linking reaction particularly in a solution mixed with the silane cross-linking agent and adjust pH in the range of about 7 to about 10.5. The above pH range is merely an example, and other pH ranges are also possible.

Examples of the pH-adjusting agent may include ammonia, or an alkali metal hydroxide such as lithium hydroxide, sodium hydroxide, potassium hydroxide, and the like. The above pH-adjusting agents are merely examples, and other pH-adjusting agents are also possible.

The emulsion may be obtained in an emulsion polymerization method or a transfer phase method. The emulsion polymerization method and the transfer phase method are not particularly limited in the manufacturing conditions.

The coating layer may be formed from a coating layer composition including the heat-resistant binder, the hydroxy group-containing polyimide particles, and the functional group-containing silane cross-linking agent.

The coating layer composition may be prepared without a particular limit in its manufacturing method but specifically, prepared by mixing the heat-resistant binder and the hydroxy group-containing polyimide particles in a solvent and then, mixing and dispersing the functional group-containing silane cross-linking agent therein.

Or, core-shell structured organic particles are first prepared and then, mixed and dispersed along with the heat-resistant binder in the solvent.

The solvent is not particularly limited, as long as the heat-resistant binder, the hydroxy group-containing polyimide particles, and the silane cross-linking agent; or the heat-resistant binder and the core-shell structured organic particles are dissolved or dispersed.

The mixing method is particularly not limited but specifically, may include a kneading method with a Hensel mixer and the like, a stirring method with a stirrer, and the like.

The coating layer may have a thickness of about 1 μm to about 5 μm, for example, about 1.5 μm to about 3 μm. The above thicknesses are merely examples, and other thicknesses are also possible.

A thickness ratio of the coating layer relative to the porous substrate may be in the range of about 0.05 to about 0.5, for example, about 0.05 to about 0.4, or about 0.05 to about 0.3, or about 0.1 to about 0.2. The above thickness ratios are merely examples, and other thickness ratios are also possible. Herein, a separator including the porous substrate and the coating layer may exhibit excellent permeability, heat resistance, adhesion, and the like.

The separator for a rechargeable lithium battery according to one embodiment may exhibit excellent air permeability, wherein air permeability per unit thickness may be less than about 160 sec/100 cc-1 μm, for example, less than or equal to about 150 sec/100 cc-1 μm, or less than or equal to about 140 sec/100 cc-1 μm. The above air permeability per unit thickness are merely examples, and other air permeability per unit thickness are also possible.

Herein, the air permeability means time (second) taken until the unit thickness of the separator transmits about 100 cc of air. The air permeability per unit thickness may be obtained by measuring air permeability for the total thickness of the separator and dividing it with the thickness.

The separator for a rechargeable lithium battery may have a break down voltage of greater than or equal to about 1.3 kV. The separator formed from the coating layer composition including the hydroxy group-containing polyimide particles according to an embodiment and the separator formed from the coating layer composition including the core-shell structured organic particles according to another embodiment may well maintain insulation up to a relatively high voltage.

In the present disclosure, the break down voltage indicates a voltage where an insulator loses insulation but becomes more conductive at a high voltage beyond a particular value when the voltage is increasingly applied to the insulator. The break down voltage is measured by disposing the insulator between metal plates and passing a direct current (DC) through the insulator under a predetermined voltage-increasing condition.

The separator for a rechargeable lithium battery may have a moisture content of less than or equal to about 500 ppm. Specifically, the separator formed from the coating layer composition including the hydroxy group-containing polyimide particles according to an embodiment and the separator formed from the coating layer composition including the core-shell structured organic particles according to another embodiment may maintain a moisture content ranging from about 300 ppm to about 500 ppm and thus contribute to improving cell life characteristics.

The separator for a rechargeable lithium battery according to one embodiment may be manufactured in various methods. For example, the separator for a rechargeable lithium battery may be formed by coating the coating layer composition on one surface or both of the surfaces of a porous substrate and drying it.

During the drying, an additional cross-linking reaction may be performed, and the cross-linking method may be selected from thermal cross-linking and photo-cross-linking.

The coating may be, for example, spin coating, dip coating, bar coating, die coating, slit coating, roll coating, inkjet printing, and the like, but is not limited thereto.

The drying may be for example performed through natural drying, drying with warm air, hot air, or low humid air, vacuum-drying, or radiation of a far-infrared ray, an electron beam, and the like, but the present disclosure is not limited thereto. The drying may be for example performed at a temperature of about 25° C. to about 120° C.

The separator for a rechargeable battery may be manufactured by lamination, coextrusion, and the like in addition to the above method.

Hereinafter, a rechargeable lithium battery including the separator for a rechargeable lithium battery is described.

A rechargeable lithium battery may be classified into a lithium ion battery, a lithium ion polymer battery, and a lithium polymer battery depending on types of a separator and an electrolyte. It also may be classified to be cylindrical, prismatic, coin-type, pouch-type, and the like depending on shape. In addition, it may be bulk type and thin film type depending on sizes. Structures and manufacturing methods for lithium ion batteries pertaining to this disclosure are well known in the art.

Herein, as an example of a rechargeable lithium battery, a cylindrical rechargeable lithium battery is for example described. FIG. 1 is an exploded perspective view showing a rechargeable lithium battery according to an embodiment. Referring to FIG. 1, a rechargeable lithium battery 100 according to an embodiment includes a battery cell including a negative electrode 112, a positive electrode 114 facing the negative electrode 112, a separator 113 between the negative electrode 112 and the positive electrode 114, an electrolyte (not shown) impregnating the negative electrode 112, the positive electrode 114 and the separator 113, a battery container 120 containing the battery cell, and a sealing member 140 that seals the container 120.

The positive electrode 114 may include a positive current collector and a positive active material layer formed on the positive current collector. The positive active material layer includes a positive active material, a binder, and optionally a conductive material.

The positive current collector may use aluminum, nickel, and the like, but is not limited thereto.

The positive active material may use a compound capable of intercalating and deintercalating lithium. Specifically, at least one of a composite oxide or a composite phosphate of a metal selected from cobalt, manganese, nickel, aluminum, iron, or a combination thereof and lithium may be used. For example, the positive active material may be a lithium cobalt oxide, a lithium nickel oxide, a lithium manganese oxide, a lithium nickel cobalt manganese oxide, a lithium nickel cobalt aluminum oxide, a lithium iron phosphate, or a combination thereof.

The binder improves binding properties of positive active material particles with one another and with a current collector, and specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more. The above binders are merely examples, and other binders are also possible.

The conductive material improves conductivity of an electrode. Examples thereof may be natural graphite, artificial graphite, carbon black, a carbon fiber, a metal powder, a metal fiber, and the like, but are not limited thereto. The above conductive material are merely examples, and other conductive material are also possible. These may be used alone or as a mixture of two or more. The metal powder and the metal fiber may use a metal of copper, nickel, aluminum, silver, and the like.

The negative electrode 112 includes a negative current collector and a negative active material layer formed on the negative current collector.

The negative current collector may use copper, gold, nickel, a copper alloy, and the like, but is not limited thereto.

The negative active material layer may include a negative active material, a binder, and optionally a conductive material. The negative active material may be a material that reversibly intercalates/deintercalates lithium ions, a lithium metal, a lithium metal alloy, a material capable of doping and dedoping lithium, a transition metal oxide, or a combination thereof. The above negative active material are merely examples, and other negative active material are also possible.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be may be graphite such as amorphous, sheet-shape, flake, spherical shape or fiber-shaped natural graphite or artificial graphite. The above crystalline carbon material are merely examples, and other crystalline carbon are also possible.

Examples of the amorphous carbon may be soft carbon or hard carbon, a mesophase pitch carbonized product, fired coke, and the like. The above amorphous carbon material are merely examples, and other amorphous carbon are also possible. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The above lithium metal alloys are merely examples, and other lithium metal alloys are also possible. The material being capable of doping and dedoping lithium may be Si, $SiO_x$ (0<x<2), a Si—C composite, a Si—Y alloy, Sn, $SnO_2$, a Sn—C composite, a Sn—Y alloy, and the like, and at least one of these may be mixed with $SiO_2$. Specific examples of the element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The above element Y are merely examples, and other element Y are also possible. The transition metal oxide may be vanadium oxide, lithium vanadium oxide, and the like.

The binder and the conductive material used in the negative electrode 112 may be the same as the binder and conductive material of the positive electrode 114.

The positive electrode 114 and the negative electrode 112 may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte solution includes an organic solvent a lithium salt.

The organic solvent serves as a medium for transmitting ions taking part in the electrochemical reaction of a battery. Specific examples thereof may be selected from a carbonate-based solvent, an ester-based solvent, an ether-based solvent, a ketone-based solvent, an alcohol-based solvent, and an aprotic solvent. The carbonate-based solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, and the like, and the ester-based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like, and the ketone-based solvent may be cyclohexanone, and the like. In addition, the alcohol-based solvent may be ethyl alcohol, isopropyl alcohol, and the like and the aprotic solvent may be nitriles such as R—CN (R is C2 to C20 linear, branched or cyclic hydrocarbon group and may include a double bond, an aromatic ring, or an ether bond), and the like, amides such as dimethyl formamide, and the like, 1,3-dioxolane, and the like, dioxolanes such as 1,3-dioxolane, sulfolanes, and the like. The above organic solvents are merely examples, and other organic solvents are also possible.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the rechargeable lithium battery, and improves lithium ion transportation between positive and negative electrodes therein. Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein x and y are natural numbers, LiCl, LiI, $LiB(C_2O_4)_2$, or a combination thereof, but is not limited thereto. The above lithium salts are merely examples, and other lithium salts are also possible.

The lithium salt may be used in a concentration ranging from about 0.1 M to about 2.0 M. The above concentration range is merely an example, and other concentration ranges are also possible. When the lithium salt is included within the concentration range, an electrolyte may have excellent performance and lithium ion mobility due to optimal electrolyte conductivity and viscosity.

Hereinafter, the above aspects of the present disclosure are illustrated in more detail with reference to examples. However, these examples are exemplary, and the present disclosure is not limited thereto.

(Preparation of Coating Layer Composition)

Preparation Example 1: Preparation of Heat-Resistant Binder

After putting distilled water (6361 g), acrylic acid (72.06 g, 1.0 mol), acrylamide (604.1 g, 8.5 mol), potassium persulfate (2.7 g, 0.01 mol), 2-acrylamido-2-methylpropanesulfonic acid (103.6 g, 0.5 mol), and a 5 N lithium hydroxide aqueous solution (1.05 equivalent based on a total amount of 2-acrylamido-2-methylpropanesulfonic acid) in a 10 L four-necked flask equipped with a stirrer, a thermometer, and a cooling tube, an internal pressure thereof was reduced into 10 mmHg with a diaphragm pump and recovered into a normal pressure, which was three times repeated.

The reaction solution was reacted for 12 hours, while the temperature was controlled to be stable within the range of 65° C. to 70° C. After decreasing the temperature down to room temperature, a 25% ammonia aqueous solution was used to adjust pH of the reaction solution into the range of 7 to 8.

In this method, a poly(acrylic acid-co-acrylamide-co-2-acrylamido-2-methylpropanesulfonic acid)sodium salt was prepared. Herein, a mole ratio among acrylic acid, acrylamide, and 2-acrylamido-2-methylpropanesulfonic acid was 10:85:5. The reaction solution (reaction product) was taken by 10 mL or so to measure a non-volatile component, and the result was 9.5% (a theoretical value: 10%).

Preparation Example 2: Preparation of Hydroxy Group-containing Polyimide (HPI) Particles 3,3'-dihydroxy-4,4'-diaminobiphenyl (37.84 g 0.175 mol) and 4,4'-oxydianiline (35.04 g, 0.175 mol) were put in a 5 L 3-neck flask equipped with a stirrer and a cooling tube and dissolved in N-methylpyrrolidone (996.37 g), and then, an internal pressure thereof was adjusted into a normal pressure by using nitrogen. While, the flask was cooled down, 4,4'-oxydiphthalic anhydride (108.57 g, 0.35 mol) was added thereto to perform a condensation reaction for 12 hours. The prepared polyamic acid was continuously heated for imidization at 160° C. to 180° C. in the same reaction bath. In order to secure a stable imidization reaction, orthoxylene (996.37 g) was used to remove water produced during the reaction in an Azeotropic distillation method, and then, finally synthesized hydroxy group-containing polyimide was immersed and washed with a mixed solvent of water:methanol in a weight ratio of 1:1.

In a 500 mL beaker, the prepared hydroxy group-containing polyimide (5 g, 1 wt % of a solution) and polyvinylpyrrolidone (5 g, the same amount as that of polyimide) were put and dissolved in 495 g of N-methylpyrrolidone and then, purified by using a 1.2 μm-sized filter. The purified solution was put in a double jacket reaction bath equipped with a stirrer and an ultrasonic disperser (VC 505, Sonics & Materials Inc.) and then, ultrasonic wave-dispersed with a magnetic stirrer for 2 seconds' dispersion and 1 second's pause, while maintained at −2° C. by using the cooler. Simultaneously, a syringe pump was used to inject a total amount of 240 ml of distilled water at a flow rate of 15 ml/h and obtain dispersion where hydroxy group-containing polyimide particles were dispersed. The prepared dispersion was centrifuged at 10,000 rpm for 60 minutes to remove the solvent and then, five times washed in the same method as above by using a mixed solvent of water:ethanol in a weight ratio of 1:1 to obtain hydroxy group-containing polyimide particles having an average particle diameter of 500 nm.

Preparation Example 3: Core-Shell Structure Hydroxy Group-Containing Polyimide (HPI) Organic Particles In a 5 L 3-neck flask equipped with a stirrer and a cooling tube, 3,3'-dihydroxy-4,4'-diaminobiphenyl (37.84 g 0.175 mol) and 4,4'-oxydianiline (35.04 g, 0.175 mol) were put and dissolved in N-methylpyrrolidone (996.37 g), and then, an internal pressure thereof was adjusted into a normal pressure by using nitrogen. While the flask was cooled down, 4,4'-oxydiphthalic anhydride (108.57 g, 0.35 mol) was added thereto to perform a condensation reaction for 12 hours. The prepared polyamic acid was continuously heated at 160° C. to 180° C. in the same reaction bath to perform imidization. In order to secure a stable imidization reaction, orthoxylene (996.37 g) was used to remove water produced during the reaction in an azotropic distillation method to immerse and wash finally-synthesized hydroxy group-containing polyimide with a mixed solvent of water:methanol in a weight ratio of 1:1.

In a 500 mL beaker, the prepared hydroxy group-containing polyimide (5 g, 1 wt % of a solution) and polyvinylpyrrolidone (5 g, the same amount as that of polyimide) were put and dissolved in 495 g of N-methylpyrrolidone and then, purified by using a 1.2 μm-sized filter. The purified solution was put in a double jacket reaction bath equipped with a stirrer and an ultrasonic disperser (VC 505, Sonics and Materials Inc.) and then, ultrasonic wave-dispersed with a magnetic agitator for 2 seconds' dispersion and 1 second's pause. Simultaneously, a syringe pump was used at a flow rate of 15 ml/h to inject a total amount of 240 ml of distilled water and thus obtain dispersion where hydroxy group-containing polyimide particles were dispersed. The prepared dispersion was centrifuged at 10,000 rpm for 60 minutes to remove the solvent and then, five times washed in the same method by using a mixed solvent of water:ethanol in a weight ratio of 1:1 to obtain hydroxy group-containing polyimide particles having an average particle diameter of 500 nm.

In a 250 ml 3-neck flask equipped with a stirrer and a cooling tube, the hydroxy group-containing polyimide particles (10 g, 10 wt % of a total weight of the dispersion) were dispersed in a mixed solvent of 45 g of distilled water and 45 g of ethanol, and then, triethoxymethylsilane (0.2 g, 2 parts by weight based on 100 parts by weight of the hydroxy group-containing polyimide particles) was dispersed therein.

While the temperature was controlled within range of 90° C. to 100° C., the reaction solution was reacted for 3 hours and additionally reacted for one hour to adjust pH into 9 to 10 by using 25% ammonia. A reaction product therefrom was five times centrifuged at 10,000 rpm by using a mixed solvent of water:ethanol in a weight ratio of 1:1. The obtained hydroxy group-containing polyimide particles coated with silane having a core-shell structure were dried at 80° C. to 120° C. in a vacuum oven overnight and obtained in a final dried powder state.

(Manufacture of Separator for Rechargeable Lithium Battery)

Example 1

The heat-resistant binder of Preparation Example 1 (10 wt % of distilled water) and hydroxy group-containing polyimide particles of Preparation Example 2 (an average particle diameter=500 nm) in a weight ratio of 1:28 were put in a water solvent and stirred for greater than or equal to 10 minutes. Subsequently, triethoxymethylsilane was added thereto in an amount of 1 wt % based on a total weight of the solid, and then, a pH adjuster was added thereto to adjust pH into 8 or higher. Then, water was added thereto, so that the total solid became 25 wt % to prepare a composition for forming a heat-resistant layer. This composition was bar-coated to be 3 μm thick on an 8 μm-thick polyethylene porous substrate (SK corp., Air permeability: 120 sec/100 cc, puncture strength: 480 kgf) and then, dried at 60° C. for 10 minutes to manufacture a separator for a rechargeable lithium battery.

Example 2

A separator for a rechargeable lithium battery was manufactured according to the same method as Example 1 except that the amount of triethoxymethylsilane was changed into 2 wt %.

Example 3

A separator for a rechargeable lithium battery was manufactured according to the same method as Example 1 except that the amount of triethoxymethylsilane was changed into 5 wt %.

Example 4

A separator for a rechargeable lithium battery was manufactured according to the same method as Example 1 except that the amount of triethoxymethylsilane was changed into 10 wt %.

Example 5

The heat-resistant binder of Preparation Example 1 (10 wt % in distilled water) and the core-shell HPI particles of Preparation Example 3 (an average particle diameter of 500 nm) in a weight ratio of 1:28 were put in a water solvent and stirred for 30 minutes, and the total solid became 25 wt % by adding water thereto to prepare a composition for forming a coating layer. The composition was bar-coated to be 3 μm thick on an 8 μm-thick polyethylene porous substrate (SK Innovation Co., Ltd., Air permeability: 120 sec/100 cc, puncture strength: 480 kgf) and then, dried at 60° C. for 10 minutes to manufacture a separator for a rechargeable lithium battery.

Example 6

A separator for a rechargeable lithium battery was manufactured according to the same method as Example 5 except that the weight ratio of the heat-resistant binder and the core-shell HPI organic particles (an average particle diameter of 500 nm) was changed into 1:35.

Example 7

A separator for a rechargeable lithium battery was manufactured according to the same method as Example 5 except that the weight ratio of the heat-resistant binder and the core-shell HPI organic particles (an average particle diameter of 500 nm) was changed into 1:20.

Example 8

A separator for a rechargeable lithium battery was manufactured according to the same method as Example 5 except that the composition for a coating layer was coated to be 2 μm thick.

Comparative Example 1

A separator for a rechargeable lithium battery was manufactured according to the same method as Example 1 except that the silane cross-linking agent was not used.

Comparative Example 2

A separator for a rechargeable lithium battery was manufactured according to the same method as Comparative Example 1 except that alumina ($Al_2O_3$ made by Sumitomo Corp., an average particle diameter=500 nm) was used instead of the hydroxy group-containing polyimide particles.

Comparative Example 3

A separator for a rechargeable lithium battery was manufactured according to the same method as Example 1 except that commercially-available polyimide particles (Sumitomo Corp., an average particle diameter=500 nm) were used instead of the hydroxy group-containing polyimide particles.

Comparative Example 4

A separator for a rechargeable lithium battery was manufactured according to the same method as Example 1 except that alumina ($Al_2O_3$ made by Sumitomo Corp., an average particle diameter=500 nm) was used instead of the hydroxy group-containing polyimide particles.

EVALUATION EXAMPLES

Evaluation Example 1: Air Permeability

The separators for a rechargeable lithium battery according to Examples 1 to 8 and Comparative Examples 1 to 4 were evaluated with respect to air permeability by measuring time (seconds) taken until each separator passed 100 cc of air and also, time (seconds) taken until a porous substrate including no coating layer passed 100 cc of air with an air permeability-measuring device (EG01-55-1 MR made by Asahi Seiko Co., Ltd.) and then, calculating increased time, and the results are shown in Tables 1 and 2.

Evaluation Example 2: Evaluation of Moisture Characteristics

Moisture of the separators of Examples 1 to 8 and Comparative Examples 1 to 4 was measured, and the results are shown in Tables 1 and 2. Herein, the moisture was measured according to a Karl-Fischer method. When the moisture was within the range of 300 ppm to 450 ppm, cell life-span improving effects were maximized.

Evaluation Example 3: Evaluation of Voltage-Resistance Characteristics

The separators of Examples 1 to 8 and Comparative Examples 1 to 4 were evaluated with respect to insulation (Break-Down Voltage, BDV), and the results are shown in Tables 1 and 2. BDV was obtained by disposing a separator between SUS plates and using TOS5301 made by KIKISUI Inc. to fix a current at 0.3 mA in an AC mode to measure when a voltage stopped increasing, while the voltage was increased up to 2.6 KV at 8 sec.

Evaluation Example 4: Thermal Shrinkage Rate (Dry Thermal Shrinkage Rate)

The separators for a rechargeable battery according Examples 1 to 8, and Comparative Examples 1 to 4 were respectively cut into a size of 8 cm×8 cm to prepare samples. The samples after drawing a 5 cm×5 cm-size quadrangle on the surface were inserted between paper or alumina powder, allowed to stand at 150° C. in an oven for 1 hour, and taken out of the oven, and each shrinkage rate between machine direction (MD) and in a traverse direction (TD) was calculated by measuring sides of the quadrangles drawn on the samples. The results are shown in Table 3.

(Wet Thermal Shrinkage Rate)

The separators for a rechargeable lithium battery according to Examples 1 to 8 and Comparative Examples 1 to 4 were respectively cut into a size of 5 cm×5 cm to prepare samples. Each sample was inserted between polyethyleneterephthalate releasing papers and then, put in an aluminum pouch, and after injecting 2 g of an electrolyte solution therein, the pouch was sealed and allowed to stand in an oven at 150° C. for one hour to measure horizontal and vertical lengths and thus calculate each shrinkage in a horizontal direction (MD) and a vertical direction (TO). The results are shown in Table 3.

TABLE 1

| Weight ratio | Heat-resistant binder | HPI particle 1:28 | Silane cross-linking agent | Coating thickness (μm) | Air permeability (Δsec) | Moisture characteristics (ppm) | BDV (kV) |
|---|---|---|---|---|---|---|---|
| | porous substrate | | | — | — | — | 1.16 |
| Example 1 | Preparation Example 1 | Preparation Example 2 | 1 | 3.0 | 22 | 428 | 1.44 |
| Example 2 | Preparation Example 1 | Preparation Example 2 | 2 | 3.0 | 21 | 432 | 1.42 |
| Example 3 | Preparation Example 1 | Preparation Example 2 | 5 | 3.0 | 50 | 438 | 1.40 |
| Example 4 | Preparation Example 1 | Preparation Example 2 | 10 | 3.0 | 55 | 421 | 1.42 |
| Comparative Example 1 | Preparation Example 1 | Preparation Example 2 | 0 | 3.0 | 15 | 430 | 1.42 |
| Comparative Example 2 | Preparation Example 1 | alumina | 0 | 3.0 | 20 | 589 | 1.17 |

TABLE 1-continued

| Weight ratio | Heat-resistant binder | HPI particle 1:28 | Silane cross-linking agent | Coating thickness (μm) | Air permeability (Δsec) | Moisture characteristics (ppm) | BDV (kV) |
|---|---|---|---|---|---|---|---|
| Comparative Example 3 | Preparation Example 1 | polyimide particle | 0 | 3.0 | 80 | 550 | 1.43 |
| Comparative Example 4 | Preparation Example 1 | alumina | 1 | 3.0 | Physical properties cannot be measured due to alumina agglomeration. | | |

TABLE 2

| Composition | Heat-resistant binder Preparation Example 1 | Core-shell structured organic particle Preparation Example 2 weight ratio | Coating thickness (μm) | Air permeability (Δsec) | Moisture characteristics (ppm) | BDV (kV) |
|---|---|---|---|---|---|---|
| Example 5 | 1 | 28 | 3.0 | 25 | 380 | 1.44 |
| Example 6 | 1 | 35 | 3.0 | 23 | 340 | 1.45 |
| Example 7 | 1 | 20 | 3.0 | 30 | 400 | 1.42 |
| Example 8 | 1 | 28 | 2.0 | 21 | 350 | 1.35 |
| Comparative Example 2 | Preparation Example 1 1 | alumina 28 | 3.0 | 20 | 589 | 1.17 |
| Comparative Example 3 | Preparation Example 3 1 | polyimide particle 28 | 3.0 | 80 | 550 | 1.43 |

Referring to Tables 1 and 2, the separators according to examples decreased moisture with excellent air permeability and exhibited improved voltage resistant characteristics.

TABLE 3

| | 150° C., 1 hr | | | |
|---|---|---|---|---|
| | Dry thermal shrinkage | | Wet thermal shrinkage | |
| | MD (%) | TD (%) | MD (%) | TD (%) |
| Example 1 | 1.9 | 1.5 | 36 | 24 |
| Example 2 | 1.3 | 1.5 | 15 | 15 |
| Example 3 | 1.7 | 1.4 | 25 | 21 |
| Example 4 | 2.0 | 1.3 | 20 | 20 |
| Example 5 | 1.0 | 1.0 | 5.0 | 5.0 |
| Example 6 | 2.0 | 2.0 | 20.0 | 20.0 |
| Example 7 | 2.0 | 2.0 | 5.0 | 5.0 |
| Example 8 | 2.0 | 1.0 | 15 | 15 |
| Comparative Example 1 | 2.8 | 2.6 | 43 | 31 |
| Comparative Example 2 | 2.0 | 2.0 | 40 | 30 |
| Comparative Example 3 | 5.0 | 4.0 | 70 | 60 |
| Comparative Example 4 | Physical properties cannot be measured due to alumina agglomeration. | | | |

Referring to Table 3, the separators according to examples exhibited greatly improved wet thermal shrinkage affecting actual cell characteristics.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A coating layer composition for a separator of a rechargeable lithium battery, the coating layer composition comprising:

a heat-resistant binder;

a hydroxy group-containing polyimide particle;

a functional group-containing silane cross-linking agent; and a solvent, wherein the functional group comprises at least one selected from the group consisting of a hydroxy group, an alkoxy group, a halogen group, an amino group, a vinyl group, and a glycidoxy group, wherein the functional group-containing silane cross-linking agent comprises at least one selected from the group' consisting of alkylalkoxysilane, vinylalkoxysilane, glycidoxyalkylalkoxysilane, aminoalkylalkoxysilane, mercaptoalkylalkoxysilane, halogenated alkylalkoxysilane, vinylhalosilane, and alkylacyloxy silane, wherein the functional group-containing silane cross-linking agent is included in an amount of 0.5 wt % to 10 wt % based on a total solid weight of the coating layer composition, and wherein the hydroxy group-containing polyimide particle comprises a structural unit represented by Chemical Formula 1-5

[Chemical Formula 1-5]

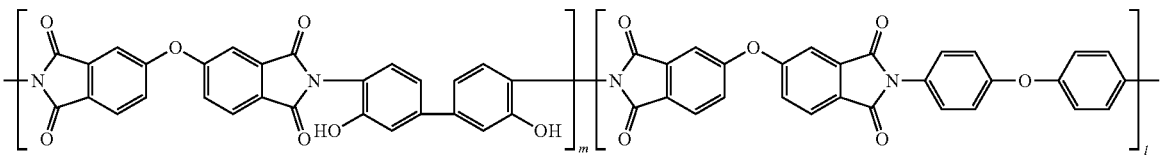

wherein 10≤m≤400 and 10≤l≤400, and
wherein the heat-resistant binder comprises a (meth) acrylic copolymer comprising:
a first structural unit derived from (meth)acrylamide;
a second structural unit derived from (meth)acrylic acid, (meth)acrylate or (meth)acrylonitrile; and
a third structural unit derived from (meth)acrylamidosulfonic acid or a salt of (meth)acrylamidosulfonic acid.

2. A coating layer composition for a separator of a rechargeable lithium battery, the coating layer composition comprising:
a heat-resistant binder;
a core-shell structured organic particle; and
a solvent,
wherein the core-shell structured organic particle comprises:
a core portion derived from a hydroxy group-containing polyimide particles, and
a shell portion derived from a functional group-containing silane cross-linking agent, wherein the shell portion is on the surface of the core portion,
wherein the functional group comprises at least one selected from the group consisting of a hydroxy group, an alkoxy group, a halogen group, an amino group, a vinyl group, and a glycidoxy group,
wherein the functional group-containing silane cross-linking agent is included in an amount of 0.5 wt % to 10 wt % based on a total solid weight of the coating layer composition,
wherein the functional group-containing silane cross-linking agent comprises at least one selected from the group' consisting of alkylalkoxysilane, vinylalkoxysilane, glycidoxyalkylalkoxysilane, aminoalkylalkoxy silane, mercaptoalkylalkoxysilane, halogenated alkylalkoxysilane, vinylhalosilane, and alkylacyloxy silane, and
wherein the hydroxy group-containing polyimide particle comprises a structural unit represented by Chemical Formula 1-5

3. The coating layer composition of claim 2, wherein the core-shell structured organic particle has a particle diameter of 100 nm to 1000 nm.

4. The coating layer composition of claim 2, wherein the core portion has a particle diameter of 70 nm to 970 nm.

5. The coating layer composition of claim 2, wherein the shell portion has a particle diameter of 5 nm to 50 nm.

6. The coating layer composition of claim 2, wherein a weight ratio of the heat-resistant binder:core-shell structured organic particle is 1:20 to 1:40.

7. The coating layer composition of claim 1 or 2, wherein the hydroxy group-containing polyimide particle has a weight average molecular weight of 100,000 to 5,000,000.

8. The coating layer composition of claim 1 or 2, wherein:
the first structural unit is included in an amount of 80 mol % to 85 mol % based on 100 mol % of the (meth)acrylic copolymer,
the second structural unit is included in an amount of 10 mol % to 15 mol % based on 100 mol % of the (meth)acrylic copolymer, and
the third structural unit is included in an amount of 5 mol % to 10 mol % based on 100 mol % of the (meth)acrylic copolymer.

9. The coating layer composition of claim 1 or 2, wherein the (meth)acrylic copolymer has a weight average molecular weight of 300,000 to 950,000.

10. The coating layer composition of claim 1 or 2, wherein the hydroxy group-containing polyimide particle is selected from a polyimide random copolymer, a polyimide block copolymer, and a combination thereof.

11. The coating layer composition of claim 10,
wherein a mole ratio of m:l is 9:1 to 1:9.

12. A separator for a rechargeable lithium battery, comprising:
a porous substrate; and
a coating layer on at least on one surface of the porous substrate,
the coating layer formed from a coating layer composition of claim 1 or 2.

13. The separator of claim 12, wherein the separator has a break down voltage of greater than or equal to 1.3 kV.

14. The separator of claim 12, wherein the separator has a moisture content of less than or equal to about 500 ppm.

15. A rechargeable lithium battery comprising:

[Chemical Formula 1-5]

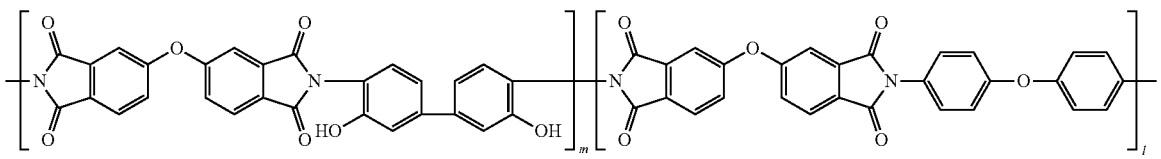

wherein 10≤m≤400 and 10≤l≤400, and
wherein the heat-resistant binder comprises a (meth) acrylic copolymer comprising:
a first structural unit derived from (meth)acrylamide;
a second structural unit derived from (meth)acrylic acid, (meth)acrylate or (meth)acrylonitrile; and
a third structural unit derived from (meth)acrylamidosulfonic acid or a salt of (meth)acrylamidosulfonic acid.

a positive electrode;
a negative electrode; and
a separator interposed between the positive electrode and the negative electrode, wherein the separator comprises:
a porous substrate; and
a coating layer on at least on one surface of the porous substrate, the coating layer formed from a coating layer composition of claim 1 or 2.

* * * * *